(12) United States Patent
Yulevitch et al.

(10) Patent No.: US 7,096,074 B2
(45) Date of Patent: Aug. 22, 2006

(54) METHODS AND APPARATUS FOR EARLY FAULT DETECTION AND ALERT GENERATION IN A PROCESS

(75) Inventors: Oren Yulevitch, Omer (IL); Jacques Seror, Jerusalem (IL); Yossi Fisher, Jerusalem (IL); Joseph Peretz, Otniel (IL); Jehuda Hartman, Rehovot (IL)

(73) Assignee: Insyst Ltd., Jerusalem (IL)

( * ) Notice: Subject to any disclaimer, the term of this patent is extended or adjusted under 35 U.S.C. 154(b) by 450 days.

(21) Appl. No.: 10/157,713

(22) Filed: May 30, 2002

(65) Prior Publication Data

US 2003/0225466 A1    Dec. 4, 2003

(51) Int. Cl.
*G05B 11/01* (2006.01)
(52) U.S. Cl. .............. 700/21; 700/28; 700/29; 700/80; 700/79; 700/78; 702/185
(58) Field of Classification Search ............ 700/21, 700/28, 29, 80, 79, 78; 702/182, 183, 185
See application file for complete search history.

(56) References Cited

U.S. PATENT DOCUMENTS

| | | | |
|---|---|---|---|
| 4,788,531 A * | 11/1988 | Corwin et al. ............ 340/945 |
| 4,943,919 A * | 7/1990 | Aslin et al. ................. 701/3 |
| 5,465,321 A * | 11/1995 | Smyth ...................... 706/20 |
| 5,768,119 A | 6/1998 | Havekost et al. |
| 5,949,677 A | 9/1999 | Ho |
| 5,949,678 A * | 9/1999 | Wold et al. ................ 700/83 |
| 6,115,656 A * | 9/2000 | Sudolsky .................. 701/35 |
| 6,314,328 B1 | 11/2001 | Powell |
| 6,606,580 B1 * | 8/2003 | Zedda et al. ............ 702/185 |
| 2002/0077792 A1 * | 6/2002 | Qui ............................ 703/2 |

* cited by examiner

*Primary Examiner*—Anthony Knight
*Assistant Examiner*—Thomas Pham

(57) ABSTRACT

A method and apparatus for providing early fault detection and alert generation in a multi-parameter process is provided. The method comprises defining a multi-dimensional space, each dimension representing a parameter of the process; applying an analysis of the process to the space in order to define regions of high and low probability of occurrence; measuring and mapping parameter values onto the space; and generating an alert whenever a parameter value is mapped into a region of low probability. The method and apparatus are also useful for identifying the cause of faults, adjusting the process to avoid faults and predicting a process-specific maintenance schedule.

38 Claims, 21 Drawing Sheets

2a

2b

2c

Normal behavior

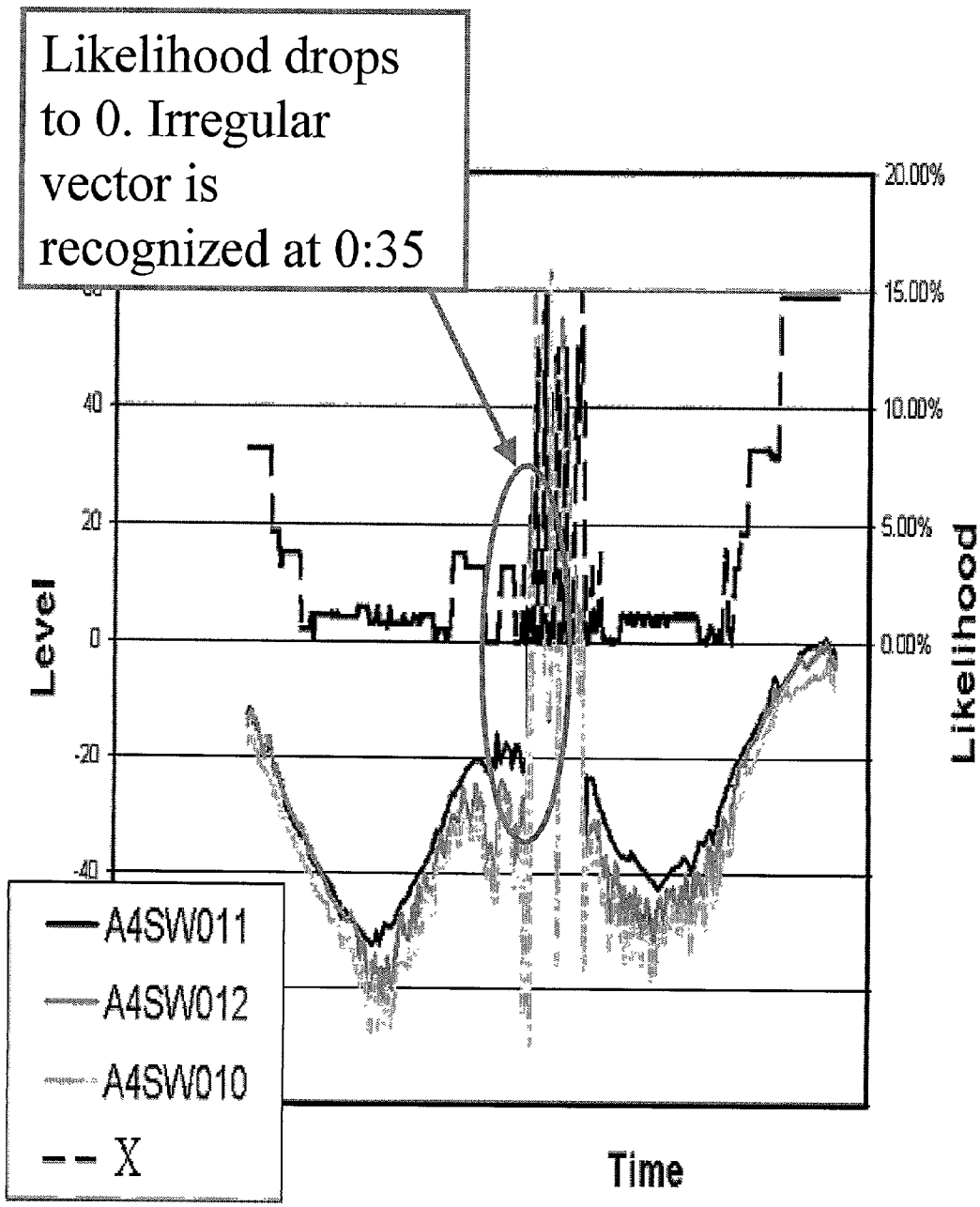
1:42 hours early warning Figure 13c

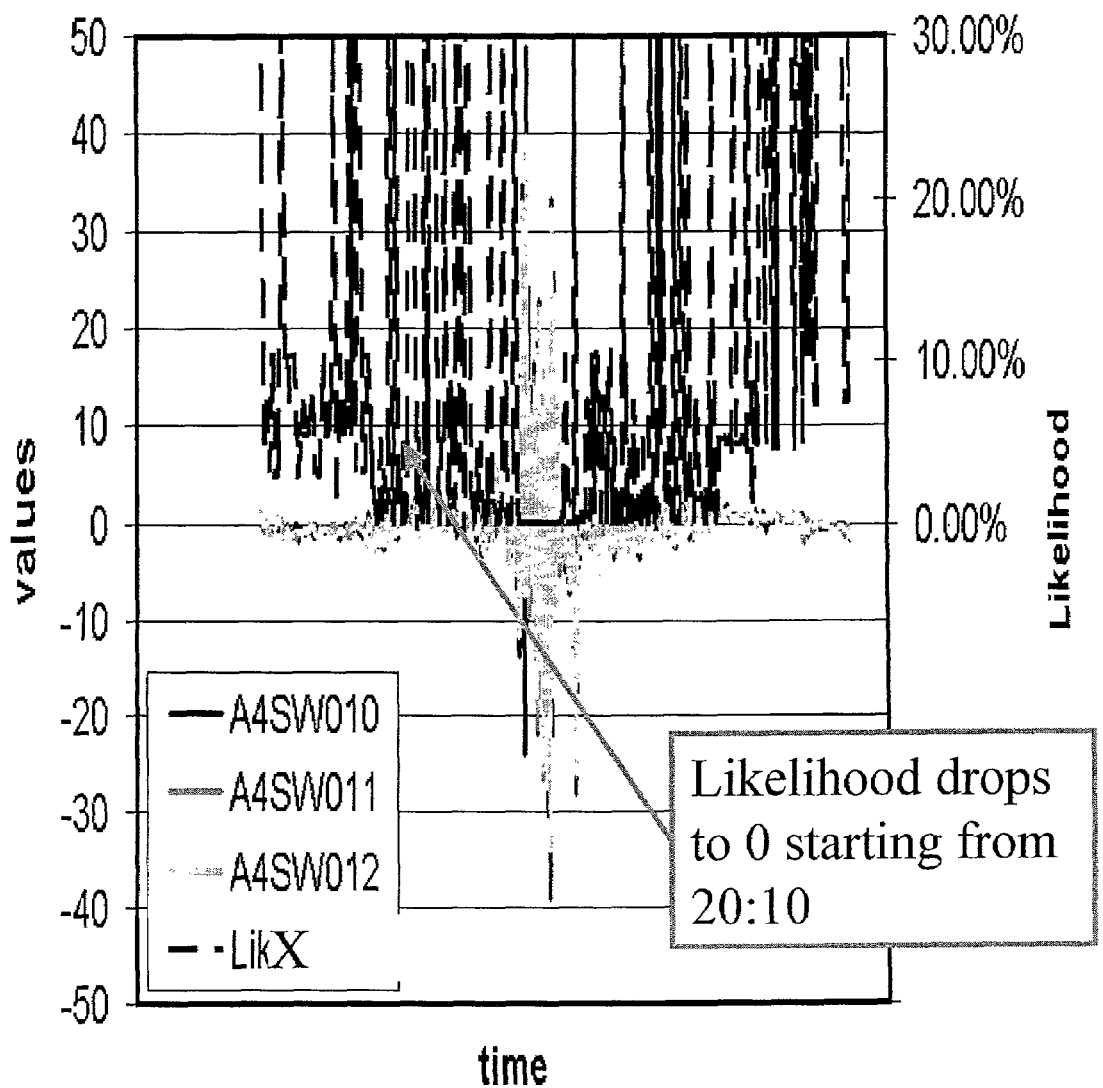
6:07 hours early warning Figure 13e

METHODS AND APPARATUS FOR EARLY FAULT DETECTION AND ALERT GENERATION IN A PROCESS

FIELD AND BACKGROUND OF THE INVENTION

The present invention relates to process oversight systems and, more particularly, to methods and an apparatus for the early detection and warning of an abnormal situation or irregular trend occurring in a multi-variable process. The invention also permits a user to analyze the causative factor(s) of an abnormal situation and to predict the appropriate maintenance time for elements of a process.

Multi-variable processes are characterized by a large number of varying parameters or elements which influence the output. Process parameters may consist of any of the measurable or calculable variables of a process. For example, an automobile has a number of engine related parameters such as coolant temperature, oil pressure, exhaust gas content levels, spark intensity and the like that will indicate whether the engine is functioning correctly or is operating within a level of dysfunction. An aircraft, as another example, has many more. Accordingly, it is common practice to monitor each critical parameter of a process or a system in order to detect an incipient dysfunction before that discrete dysfunction causes a system dysfunction, i.e., a breakdown of the engine.

Such parameters are either continuously or periodically monitored by sensors. Each parameter has its own defined limit, some being between a certain high and low, others greater than a certain threshold value and others lower than a certain threshold value. Exceeding the limit indicates dysfunction and typically triggers an alert signal, such as a red light, a buzzer, a gauge needle entering a defined area or exceeding a red line, etc. These parameters are monitored individually and their dysfunction alerts are activated without regard to the status of other parameters that could, in fact, be functionally related.

In reality, relationships often exist between the various parameters of a process, and methods of monitoring and measuring such interrelated parameters are commonly in use. Such multivariate Statistical Process Control (SPC) methods are known in the prior art. However, such methods suffer from a number of shortcomings, such as the following:

1. Alerts are generated as a result of a negative occurrence during one of the stages of a multi-stage process, but often no indication is given regarding the primary source of the dysfunction that led to the alert. Thus, problems are frequently identified too late and even then, no analysis can be done after the alert generation.

2. Interactions are typically not well addressed. When dealing with multiple factors, multi-variate analysis or logic based systems are used. However, while interactions can be evaluated, the reality is that they rarely are, as potentially too many exist.

3. Most multivariate models, like those created using linear regression or logical regression, assume that a linear relationship applies among variables. These assumptions are not always correct.

4. The alert limit indicating dysfunction for each parameter is usually constant and does not vary even though the relationship of the parameter to other variables of the same process will cause the limit to be variable, thus causing an alert to signal an alarm when, in fact, there is no dysfunction and, similarly, to not signal when there is a dysfunction.

U.S. Pat. No. 5,768,119 to Havekost teaches an SPC system including alert priority adjustment. The system includes an alert and event monitoring and display application which users can easily prioritize. The system monitors and uniformly displays diagnostic information on processes comprising different devices. The invention is particularly useful for prioritizing various alerts but does not relate to the causes of the alerts nor to preventative measures that can be taken by early detection.

U.S. Pat. No. 5,949,677 to Ho teaches an improved SPC with fault detection and correction capabilities. A redundant control architecture which includes a primary control system and a monitor control system is provided, with each control system generating a control signal. The difference between the two control signals is monitored by a fault detection system. The fault detection system comprises an integrator and a memory capable of recording signal differences for a predetermined period of time. The use of memory allows signal differences to be added to the integrator and subtracted at a later time. This invention is useful for eliminating noise effects but does not relate to the causes of the alerts nor to preventative measures that can be taken by early detection.

U.S. Pat. No. 6,314,328 to Powell teaches an alert generation method which allows pinpointing the parameter that caused the alert but does not relate to other contributory factors.

There is thus a widely recognized need for, and it would be highly advantageous to have, a method of providing an early warning of an abnormal situation in a multi-variate process devoid of the above limitations.

SUMMARY OF THE INVENTION

Accordingly, it is an object of the present invention to provide an early warning of an abnormal situation in a multivariate process.

It is a further object of the present invention to identify a parameter of a multivariate process causing an abnormal situation therein.

It is a further object of the present invention to predict an appropriate maintenance time in order to reduce the likelihood of occurrence of an abnormal situation.

According to one aspect of the present invention there is provided a method of providing an early warning of an abnormal situation in a process subject to influence by at least two parameters, the method comprising a. defining a space representing the process comprising at least two dimensions, each dimension representing a parameter of the process; b. applying an analysis of the process to the space in order to define regions of high and low probability of occurrence within the space; c. measuring the parameters to determine their current values and forming process vectors based upon the measured parameter values; d. mapping the process vectors onto the space; and e. generating a signal indicating an abnormal situation whenever the process vectors are mapped into a region of low probability.

According to another aspect of the present invention there is provided a method of developing a model of a multi-parameter process for the purpose of providing an early warning of an abnormal situation in the process, the developing comprising: a. defining a space representing the process, the space having a dimension representing each parameter of the process; b. extracting values for each of the parameters; c. mapping the extracted parameter values onto the space; and d. applying an analysis of the mapped parameter values in order to define regions of high and low probability of occurrence within the space such that the regions of high and low probability of occurrence provide a model of the process.

According to features in the described preferred embodiments the model is variable according to subsequent mapping of parameter values.

According to another aspect of the present invention there is provided a method of providing an early warning of an abnormal situation in a multi-parameter process using a model of the process comprising a defined space representing the process, the space having defined therein regions of high and low probability of occurrence of values of the parameters, the method comprising a. measuring the parameters to determine current values thereof; b. forming process vectors based upon the measured parameter values; c. mapping the process vectors onto the model; and d. generating a signal indicating an abnormal situation whenever the measured parameter values are mapped into a region of low probability.

According to another aspect of the present invention there is provided, in a process subject to influence by at least two parameters, each having a range of discrete values, a method of providing an early warning of an abnormal situation caused by at least one parameter, the method comprising a. defining a space representing the process comprising at least two dimensions, each dimension representing a parameter and being divided into discrete areas corresponding to the discrete values of the parameter, thereby to discretize said space; b. applying an empirical analysis of the process to the discretized space in order to define discrete regions of high and low input probability within the space, or to define normal and abnormal values within said range of discrete values of at least one of said parameters; c. measuring the parameters to determine their current values and forming a process vector based upon the measured parameter value; d. mapping the measured parameter values onto the space; and e. generating a signal indicating an abnormal situation whenever the measured parameter values are mapped into a discrete region of low probability.

According to another aspect of the present invention there is provided an apparatus for generating an early warning of an abnormal situation in a process subject to influence by at least two parameters comprising a. a learning unit for developing a model of the process comprising (i) an analysis unit for defining a space having at least two dimensions representing the process, each dimension representing a parameter of the process; (ii) at least one extracting unit for extracting values relating to the parameters; and (iii) a mapping unit for mapping the parameter values onto the space; the analysis unit being further for analyzing the mapping in order to divide the space into regions of high and low probability of occurrence, thereby to form the model; and b. an application unit comprising (i) at least one parameter measuring unit for measuring at least one parameter to determine at least one parameter value and to form at least one process vector based upon the measured parameter value; (ii) a mapping unit for mapping at least one process vector onto the model; and (iii) an alert unit for generating a signal when a process vector is mapped onto a region of low probability.

According to features in the described preferred embodiments the application of analysis of parameter values is ongoing and in at least some of the regions of high and low probability of occurrence are continually adjusted.

According to features in the described preferred embodiments at some of the defined regions of high and low probability of occurrence are predesignated.

According to features in the described preferred embodiments the range of the current values is divided into at least a high and low region.

According to features in the described preferred embodiments the method further comprises dividing the parameter values into discrete value segments and dividing the space into discrete areas, and using the value segments to assign priority values to each of the areas.

According to features in the described preferred embodiments the method further comprises providing associations between the parameters by allowing a user to a. select a mapped parameter; b. examine selected associated parameters; and c. examine further selected parameters associated with the selected parameters; thereby to identify causes of the abnormal situations.

According to features in the described preferred embodiments the process is subject to influence by at least three parameters, and the space comprises at least three dimensions, each dimension representing a parameter of the process.

According to features in the described preferred embodiments the process is subject to influence by four or more parameters, and the space comprises four or more dimensions, each dimension representing a parameter of the process.

According to features in the described preferred embodiments the process is subject to influence by ten or more parameters, and the space comprises ten or more dimensions, each dimension representing a parameter of the process.

According to features in the described preferred embodiments the process is subject to influence by at least one virtual parameter.

According to features in the described preferred embodiments the parameters comprise at least one of a group consisting of process inputs, process outputs and intermediate values derived from the process.

According to features in the described preferred embodiments the relationship between the parameters is non-linear.

According to features in the described preferred embodiments the analysis is an empirical analysis.

According to features in the described preferred embodiments the analysis is a statistical analysis.

According to features in the described preferred embodiments the alert unit is further for generating a signal when a process vector is mapped drifting toward a region of lower probability.

According to features in the described preferred embodiments the signal is visible or audible.

According to features in the described preferred embodiments the signal is an interruption of said process.

According to features in the described preferred embodiments the signal is a variation of the process.

According to features in the described preferred embodiments the mapping of the values of at least some of the parameters onto the space is used to determine a maintenance schedule for the process.

According to features in the described preferred embodiments a probability calculation is used to determine frequency of maintenance.

According to features in the described preferred embodiments the mapping is repeatedly carried out, the movement of the parameter values within the space being used to determine frequency of maintenance.

According to features in the described preferred embodiments the apparatus further comprises a maintenance scheduling unit within the application unit for monitoring the parameter values in order to schedule maintenance of the process.

According to features in the described preferred embodiments the apparatus further comprises a diagnostic unit within the application unit for providing associations between the parameters by allowing a user to a. select a mapped parameter; b. examine selected associated parameters; and c. examine further selected parameters associated with selected parameters; thereby to identify causes of abnormal situations in the process.

According to features in the described preferred embodiments the apparatus further comprises a process adjustment unit within the application unit for using the regions of high and low probability of occurrence to dictate adjustment of at least one parameter, thereby to avoid an abnormal situation.

According to features in the described preferred embodiments the extracting unit is further for dividing the parameters into discrete value segments and the analysis unit is further for dividing the space into discrete areas and using the value segments to assign priority values to each of the areas.

The present invention successfully addresses the shortcomings of the presently known configurations by providing a method and an apparatus for providing early fault detection, identifying causative factors and determining appropriate maintenance times in a multivariate process.

BRIEF DESCRIPTION OF THE DRAWINGS

With specific reference now to the drawings in detail, it is stressed that the particulars shown are by way of example and for the purposes of illustrative discussion of the preferred embodiment of the present invention only, and are presented in the cause of providing what is believed to be the most useful and readily understood description of the principles and conceptual aspects of the invention. In this regard, no attempt is made to show structural details of the invention in more detail that is necessary for a fundamental understanding of the invention, the description taken with the drawings making apparent to those skilled in the art how the several forms of the invention may be embodied in practice.

In the drawings:

FIGS. 13a–e are graphic illustrations of the development of an early warning of an abnormal situation in accordance with embodiments of the present invention;

DESCRIPTION OF THE PREFERRED EMBODIMENTS

Figure 1:
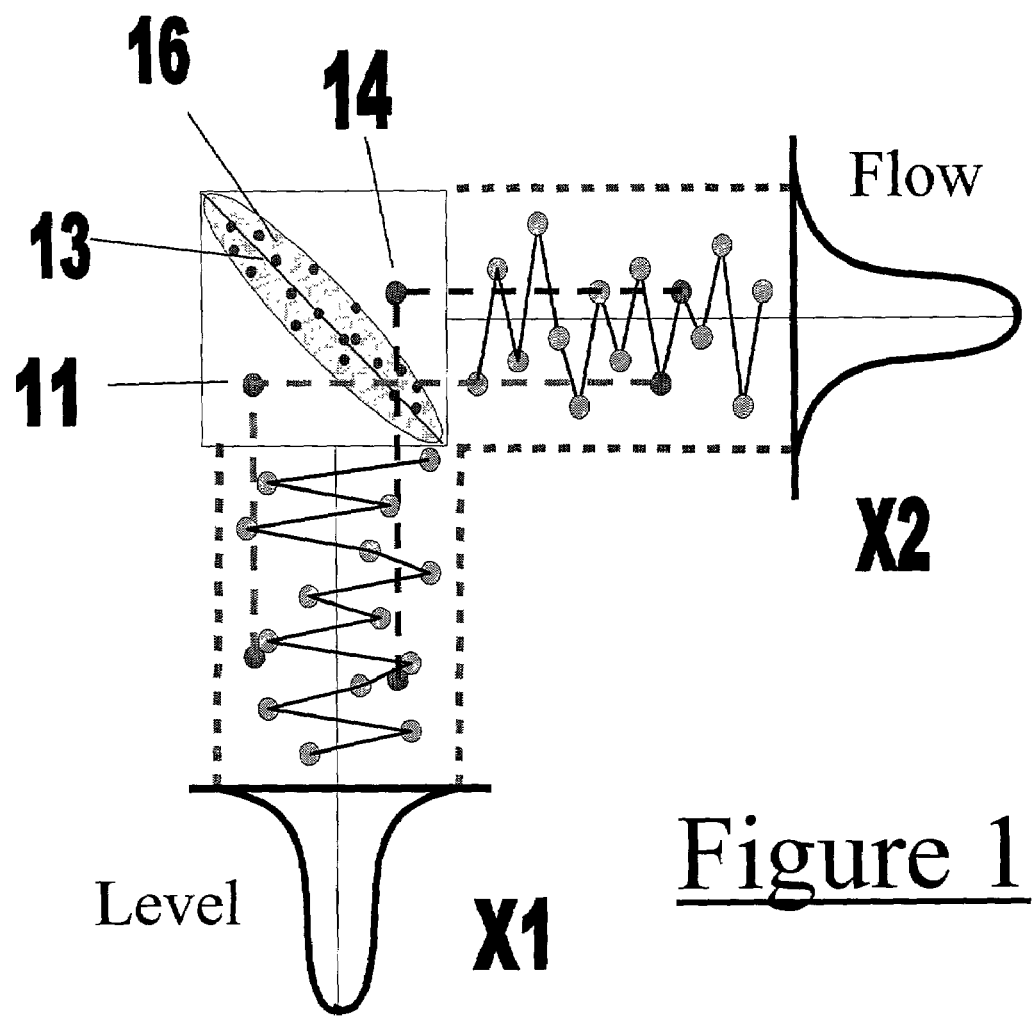
FIG. 1 is a simplified diagram of two variables influencing a process observed together, according to the prior art.

The present invention is of a method of providing early detection of abnormal situations, hereinafter referred to as faults, occurring in various types of processes, identifying the cause of such faults, and determining the frequency of maintenance in order to prevent such faults.

The principles and operation of a method for fault detection according to the present invention may be better understood with reference to the drawings and accompanying descriptions.

Before explaining at least one embodiment of the invention in detail, it is to be understood that the invention is not limited in this application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1 which shows a simplified diagram of two variables influencing a process, each one measured and mapped onto a space representing the process, according to the prior art. Shown is the construction and operation of a conventional multivariate Statistical Process Control (SPC) which illustrates data taken over a certain time period for two variable parameters, hereinafter referred to as X1 and X2 respectively, that influence a process. When either parameter X1 or X2 is observed individually, all of the parameter values fall within its own individual limits. However, when X1 and X2 are mapped in relation to the axes of a two dimensional space, experience shows that most of the values of each falls within a certain elliptical area 16. Points such as 11 and 14 which are mapped outside of area 16 indicate that a combination of point 11 and point 14 is low-probability and therefore indicative of an abnormal situation. This prior art approach does not take into account other process parameters or conditions that may have influenced the two variable parameters and may also rely on intuition to define area 16. As can be seen, an SPC according to the prior art is able to detect these faults because the behavior of the two parameters is based upon a linear relationship that could be represented by the line 13 or is otherwise intuitively understood by the process engineer. This is, in fact, the underlying premise of prior art multivariate SPC methods, which in most cases assume linearity.

There are prior art solutions for non-linear multi-variate SPC methods which are based upon very complicated mathematical models that are difficult to rely upon or are only good in the specific cases for which the model has been defined. Accordingly, prior art SPC methods are not reliable in providing early detection of faults in multivariate processes wherein there are more than two parameters or wherein the parameters do not have a linear or other simple mathematically defined relationship.

Figure 2:
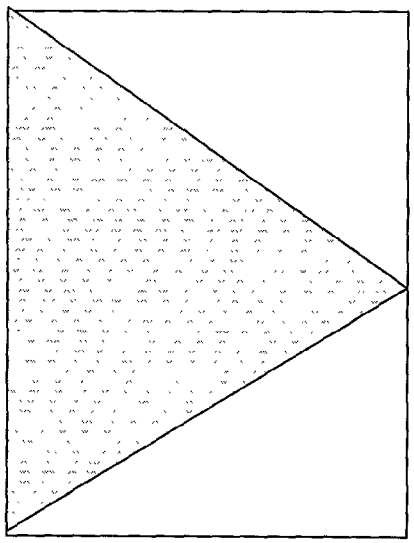
FIGS. 2a–c are illustrations of a space reflecting non-linear relationships between two parameters.
Figure 2:
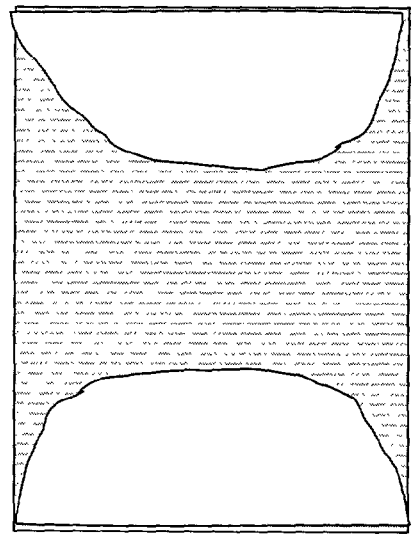
Figure 2:
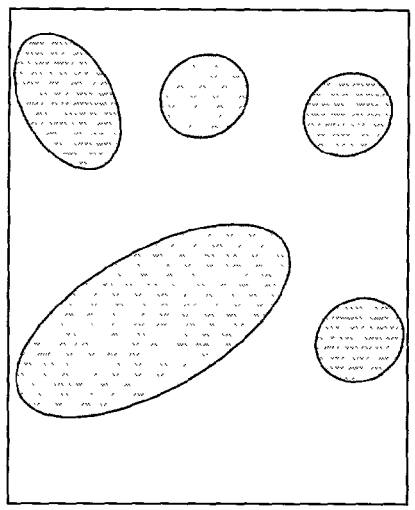

In contrast, reference is made to FIG. 2 which shows examples of non-linear relationships existing between parameters. As can be seen, values measured for such combined parameters may fall within many different patterns, reflecting the relationship between the variations of the parameters. FIGS. 2a and 2b illustrate non-linear relationships which are mapped onto a space in which the values fall into one contiguous area. FIG. 2c illustrates a relationship in which the mapped values fall into five discrete areas. Clearly, the relationship of the parameters influencing the processes illustrated do not have a linear or other simple mathematically defined relationship. It is one of the advantages of the present embodiments that no definable relationship need exist between the parameters of a process in order to detect faults in the process.

Accordingly, the present embodiments are particularly advantageous for detecting faults in processes that have more than two parameters and/or processes in which the parameters have a non-linear relationship or a relationship that cannot be described by a mathematical model. According to the present embodiments, no underlying assumption of any type of model is presumed.

Figure 3:
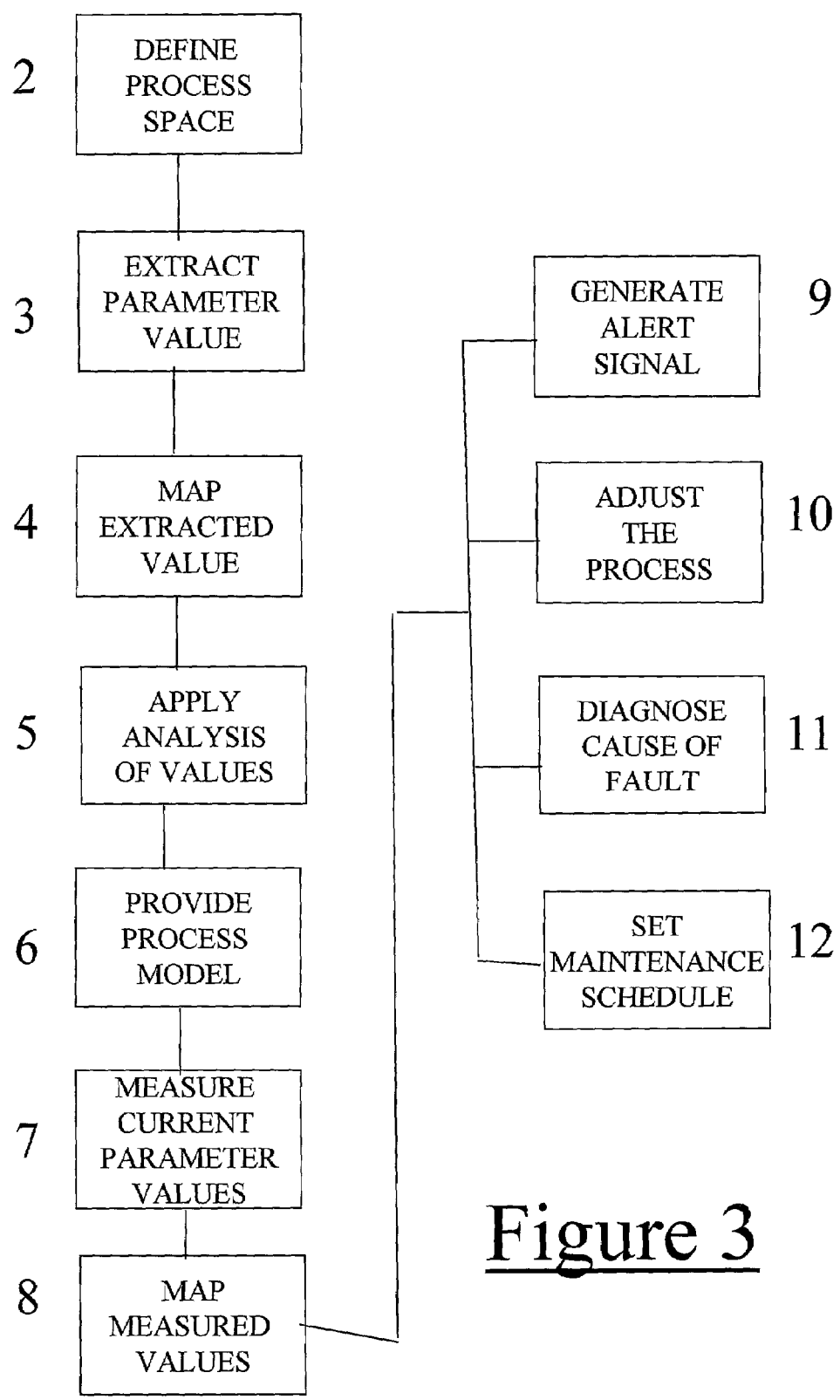
FIG. 3 is a block diagram illustrating a method of modeling a process so as to be able to provide a warning of subsequent development of abnormal situations therein, according to an embodiment of the present invention.

Reference is made to FIG. 3, which illustrates a method of modeling a process so as to be able to provide a warning of subsequent development of abnormal situations therein, according to an embodiment of the present invention, hereinafter referred to as method 1. Method 1 includes a series of steps for providing an early warning of a fault in a process subject to influence by at least two parameters. The first step 2 comprises defining a space representing the process. The space has a number of dimensions corresponding to and representing each parameter of the process that is being monitored for fault occurrence.

The next step 3 comprises extracting values for each of the parameters. The values may be extracted from historical information in a database or records, or may be acquired from an active process by measurement.

The next step 4 comprises mapping the extracted parameter values onto the space in order to see where they fall and to observe a pattern of occurrence.

The next step 5 comprises applying an analysis of the mapped parameter values in order to define regions of high and low probability of occurrence within the space. As illustrated in FIGS. 2a–c, the pattern may take any configuration, depending upon the relationship of the parameters and the performance of the process being examined.

It is understood that step 3, step 4 and step 5 may continue on an ongoing basis in order to continually adjust the regions of high and low probability of occurrence. It is further understood that pre-defined regions of high and low probability may be assigned by process engineers or others familiar with the process. Thus the process engineer is able to use his knowledge to apply certain constraints to the system.

Step 6 comprises using the defined regions of high and low probability of occurrence to provide a model of the process.

The six abovelisted steps may be regarded as the learning or model-building stage of method 1. The following steps constitute the application stage of method 1.

Step 7 comprises measuring current parameters of the process to determine their current values and to form the measured parameter values into process vectors.

The next step 8 comprises mapping the process vectors onto the model.

The next step 9 comprises generating a signal indicating an abnormal situation whenever a process vector is mapped into a region of low probability or onto a region deemed by the process overseer to be worthy of an alert. The decision about which process vectors may trigger an alert is within the purview of the process overseers.

An alternative step 10 to step 9 above may preferably comprise adjusting the process, via at least one parameter, as dictated by the mapping within the high and low probability regions. A further alternative step 11 may preferably comprise diagnosing the cause of the fault by examining selected parameters associated with the parameter whose current value was mapped into a region causing an alert. A further alternative step 12 may preferably comprise setting a maintenance schedule based upon the mapping of process vectors within the regions.

Each of the above steps will be more fully discussed hereinafter in the context of examples illustrated in the subsequent drawings.

Figure 4:
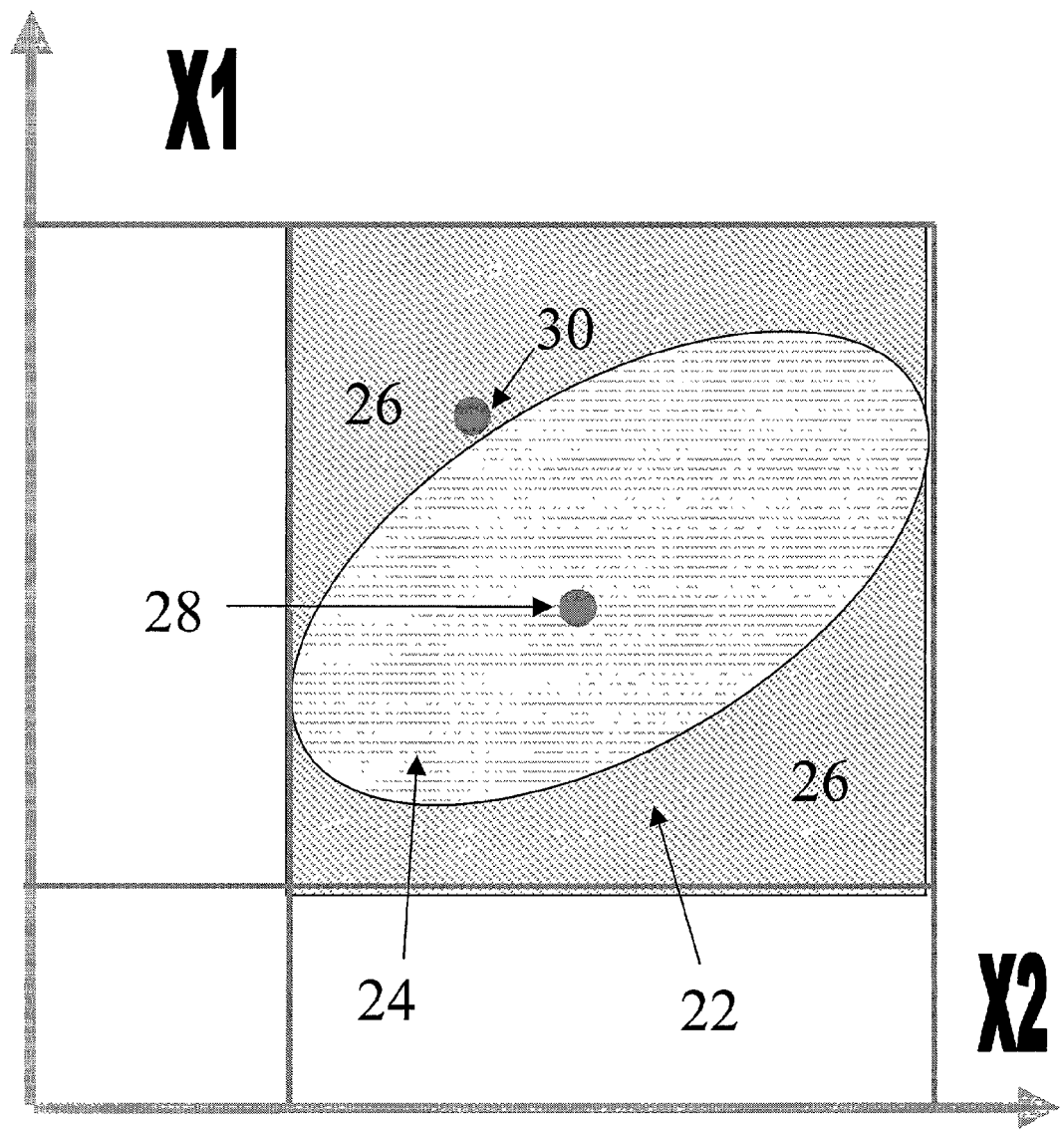
FIG. 4 is an illustration of a space representing a multivariate process.

Reference is made to FIG. 4, which is a graphic illustration of a space representing a multivariate process created in accordance with method 1. Method 1 provides an early warning of a fault in a process, which is subject to influence by parameters X1 and X2. The diagonally striped rectangular space 22 represents the process, which includes the universe of possible combinations that are within both X1's and X2's limits. X1 represents one dimension of space 22 and X2 represents another dimension of space 22. An analysis of the process is made in order to define regions of high probability and low probability of occurrence within space 22 which thereafter constitute a model of the process. In order to carry out an analysis, it is necessary to extract or accumulate many data points based upon the values of parameters X1 and X2, which provide the learning data. The recurrent values of parameters X1 and X2 may be extracted from a database, measured, provided by process engineers or otherwise acquired and mapped onto space 22 in order to build a pattern upon which to define regions of high and low probability of occurrence. This statistical or empirical model is formulated showing the relative probability of data points falling within areas of space 22. The central elliptical region is the area into which most of the learning data falls and is hereinafter referred to as high probability region 24. The peripheral region outside of region 24 is the area into which less of the learning data falls and is referred to as low probability region 26. In the process illustrated, the total area that is occupied by region 24 in proportion to space 22 according to the current embodiment is approximately 50%. It is understood that this proportion may vary, as may the pattern of the regions relative to one another. It is further understood that regions 24 and 26 may vary in shape and size as a result of ongoing mapping of parameter values or may be predesignated in shape and size by process engineers.

In order to provide an early warning of a fault, parameters X1 and X2 are measured to determine their current values. The current values are plotted on their respective axes of space 22 and are combined to indicate a process vector which is mapped onto space 22. A new process vector 28 that falls within region 24 is a frequent observation and therefore does not indicate a potential fault. However, a process vector 30 that falls in region 26 will be defined as an indication of a potential or real fault. When a process vector is defined as an indication of a fault, a signal constituting an alert for fault detection may preferably be activated. Either of points 28 and 30 studied individually and broken down into its components X1 and X2 would not have triggered an alert as each is well within the limits of either X1 or X2 taken individually. It is by combining these two parameter values and mapping them together that early fault detection is enabled.

It is understood that method 1 is specifically designed to enable early fault detection in a process comprising three or more parameters and such parameters may be any process input, process output or intermediate value that may be measured. Moreover, a parameter may be a virtual parameter that can be known solely by reason of interpolation or extrapolation of values of other parameters. Virtual parameters may, for example, be unmeasurable outputs resulting from the linkage of two tools in series, where the output of one is the input of the other, and may only be determinable by applying a model to the first tool or making an inference from a measured value.

Figure 5:
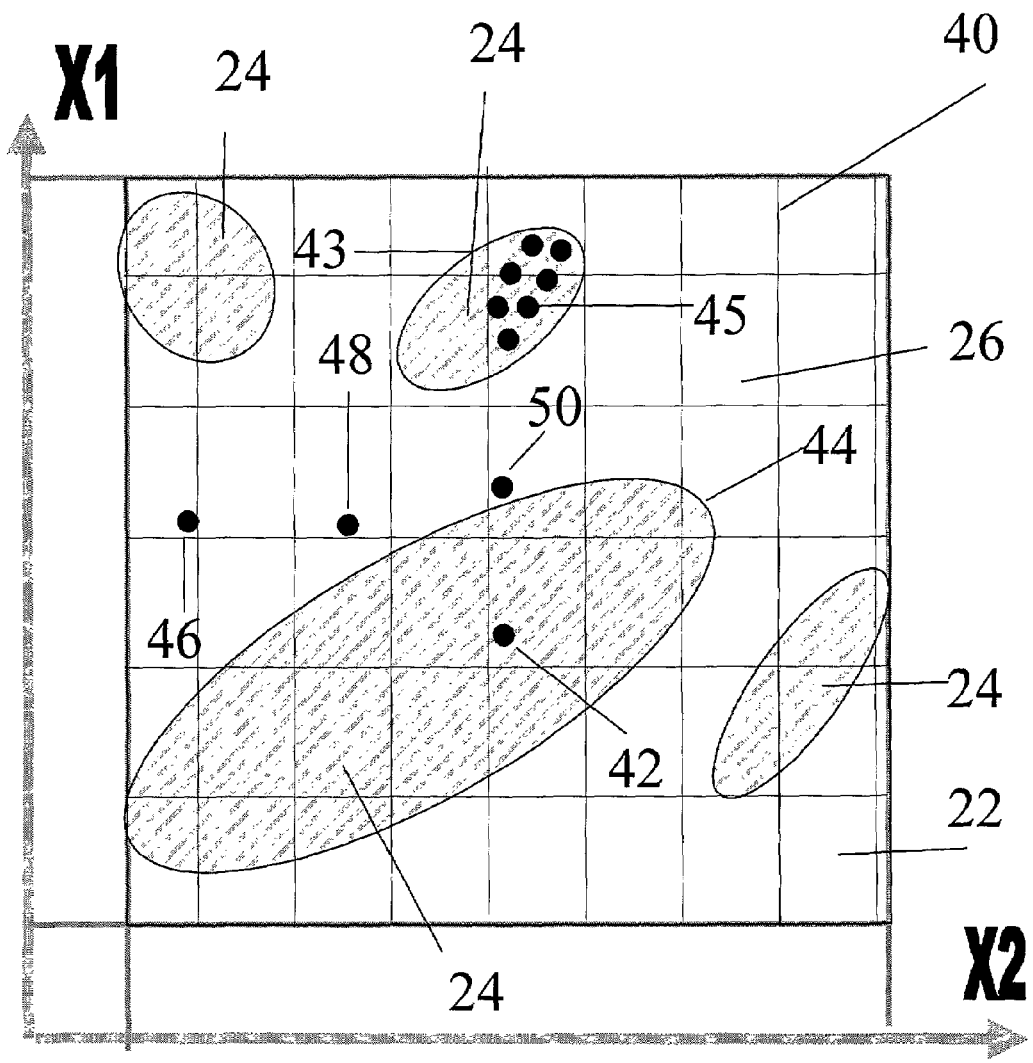
FIG. 5 is an illustration of the discretization of the space of FIG. 4.

Reference is made to FIG. 5 which illustrates the discretization of space 22 into smaller areas. It is noted that a two-parameter process is illustrated here only for simplicity's sake. A three-parameter process would be represented by the volume within a cube and an n-parameter process would be represented by an n-dimensional hyper-volume within an n-dimensional hypercube. Space 22, in every case, will be divided into discrete areas. For example, space 22 of a two parameter process will have two dimensions and will be divided into areas, space 22 of a three parameter process will have three dimensions and will be divided into cubes, etc. In FIG. 5, therefore, the total of space 22 is divided into discrete areas illustrated by grid 40 superimposed thereon. Space 22 in the illustrated example has four high probability regions 24 as defined by the identified areas therein.

Each possible combination of the parameter values can be mapped as a process vector onto an area within space 22. As these areas represent a function of the parameters, each discrete area is assigned a probability of occurrence of the particular combination of parameters that that particular area represents. The probability of occurrence within each area is calculated from the relative amount of process vectors that have been mapped thereon.

Assigning a probability value for each area is done based on the learning data from which probabilities may be assigned. The learning process vectors are first mapped onto the specific correct area. The number of process vectors in each of the areas is counted, and the probability function for each area is set to be the number of process vectors in each area divided by the total number of process vectors in space 22. The probability functions of the areas combine in defining high probability region 24 and low probability region 26. It is understood that the number of process vectors which comprise the learning data may vary widely, depending upon the nature of the process being monitored. Moreover, the learning data may continue to be updated and may vary as subsequent parameter values are extracted or measured as the process continues to operate. Such updating may occur simultaneously with the application function of method 1.

From this analysis, future process vectors may be judged as indicative of faults based upon onto which region they are mapped. For example, should a process vector be measured to fall within an area of region 24, no fault will be indicated and no signal generated indicating a fault. If, on the other hand, a process vector is measured to fall within an area of region 26, a fault may be indicated and an alert signal generated. This is the simplest application of method 1.

However, not all process vectors are accurately measurable and not all high and low priority areas are clearly delineated. This is necessarily so, as processes typically have gradual and detectable approaches to fault situations. For a process vector 50 falling into a borderline area between region 44 and the low probability region 26, the probability of occurrence is lower than for process vector 42, which falls within the middle of region 44. On the other hand, it is higher than the probability of occurrence for process vectors 46 and 48, which fall clearly outside of region 44. Upon the mapping of process vector 50, an alert signal may or may not be generated depending on a predetermined threshold level of alert generation. Indeed, regions may overlap during the process of delineation. However, they may still be defined by using fuzzy region analysis in which regions are described based upon criteria that vary. Thresholds for alert signal generation may be set according to the needs of the process as the regions of high and low probability of occurrence continue to be defined.

However, a greater degree of precision may be required in a specific process, for example, one having danger of loss of life associated with failure such as an aircraft engine. Accordingly, it may be necessary to more clearly define the system of regions. For example, once a high probability region 24 or a low probability region 26 is defined, it is possible to assign relative degrees of probability to process vectors mapped therein in order be more precise in the identification of a fault. One way of doing this is to use the same process of discretization and analysis to define higher and lower probability sub-regions within each region 24 and 22. Another way to achieve precision is to employ different thresholds or modes of analysis within a region, such as, for example, a fault could be indicated when all of the process vectors within a high probability region tend to be concentrated together or fall within a certain subpart of the region or even start to drift towards the boundary of the region. Such an occurrence is shown by process vector 45 and its surrounding process vectors being grouped close to the edge of region 43.

In summary, method 1 serves to illustrate the functioning of a process. Those overseeing the process must decide how to react to the information and alert signals provided.

The process thus far described is relatively straightforward and simple. According to a preferred embodiment of the present invention, parameter values are analyzed in order to define regions of high and low probability of occurrence. The area of space 22 is discretized. A degree of membership is computed for each new process vector, which is classified to a particular region to which it has the highest degree of membership.

It is understood, however, that sufficient learning data must be available in order to define regions with any precision. In all SPC's and other methods of early fault detection, there must be empirical or calculated data against which to judge a new process parameter. Stated in terms of the construct of method 1, if there are not enough mapped process vectors, there may be empty areas in regions that aren't really problematic, but which cause false alerts when the process behaves completely normally simply because no process vectors were mapped thereon.

The size of the database varies according to the number of parameters of the process and on the chosen discretization level: The number of discrete areas grows exponentially with the number of variables and polynomially with the level of discretization. For example: a system with 10 measured variable parameters, each with 4 discretization levels, will have $4^{10}$=1,048,576 discrete areas. As the level of discretization increases, the accuracy of the recognition becomes better. However, more data will be needed as the number of discrete areas increases, otherwise there will necessarily result a larger number of areas without sufficient data.

Most processes are continuing processes and discrete parameter values continue to be measured. Therefore, method 1 becomes more accurately predictive over time. However, the problem is that there may be insufficient data to accurately define behavior of the process at a time at which a parameter value is mapped. Method 1 may be used in such situations as it is capable of assigning a probability indication to a process vector that is mapped onto a space 22 for which there is scant learning data. The challenge is to define the probability of occurrence of a process vector in an area of a discretized space 22 where there are few or no process vectors mapped in many areas thereof. This is problematic whether the process vector is mapped within a defined region or outside of a defined region.

Solutions to this problem can be undertaken in either of two separate circumstances. The first is where there is statistically sufficient data to enable an interpolation or extrapolation of a process vector's existing relationship to a family of density probability functions. In this solution, an assumption is made that the process is behaving in the same way as one family of the density functions. Following this assumption, a particular function representative is calculated by identifying the statistical parameters for this particular region. Once a suitable continuous density probability function for this region has been identified, a probability of occurrence for each area within the region is determined. This is repeated with respect to each region. For example, for a one-dimensional density probability function, the statistical parameters are the mean and the standard deviation. For a two-dimensional density probability function, the probability of occurrence may be calculated as follows. If the continuous probability density function is: $f(x_1, x_2)$, the probability that a parameter value will fall inside an area whose coordinates are [a,b]×[c,d], is:

$$P(a \leq x_1 \leq b, c \leq x_2 \leq d) = \int_c^d \int_a^b f(x_1, x_2) dx_1 dx_2 \approx f\left(\frac{a+b}{2}, \frac{c+d}{2}\right) \cdot (b-a) \cdot (d-c).$$

This calculation is solely exemplary and is not intended to indicate a limitation upon the application of method 1.

Another way to calculate the probability of occurrence of a particular area within the region is by determining the kernel function of the probability of occurrence by the opposite means of the abovementioned calculation by using the kernel regression method.

Figure 6:
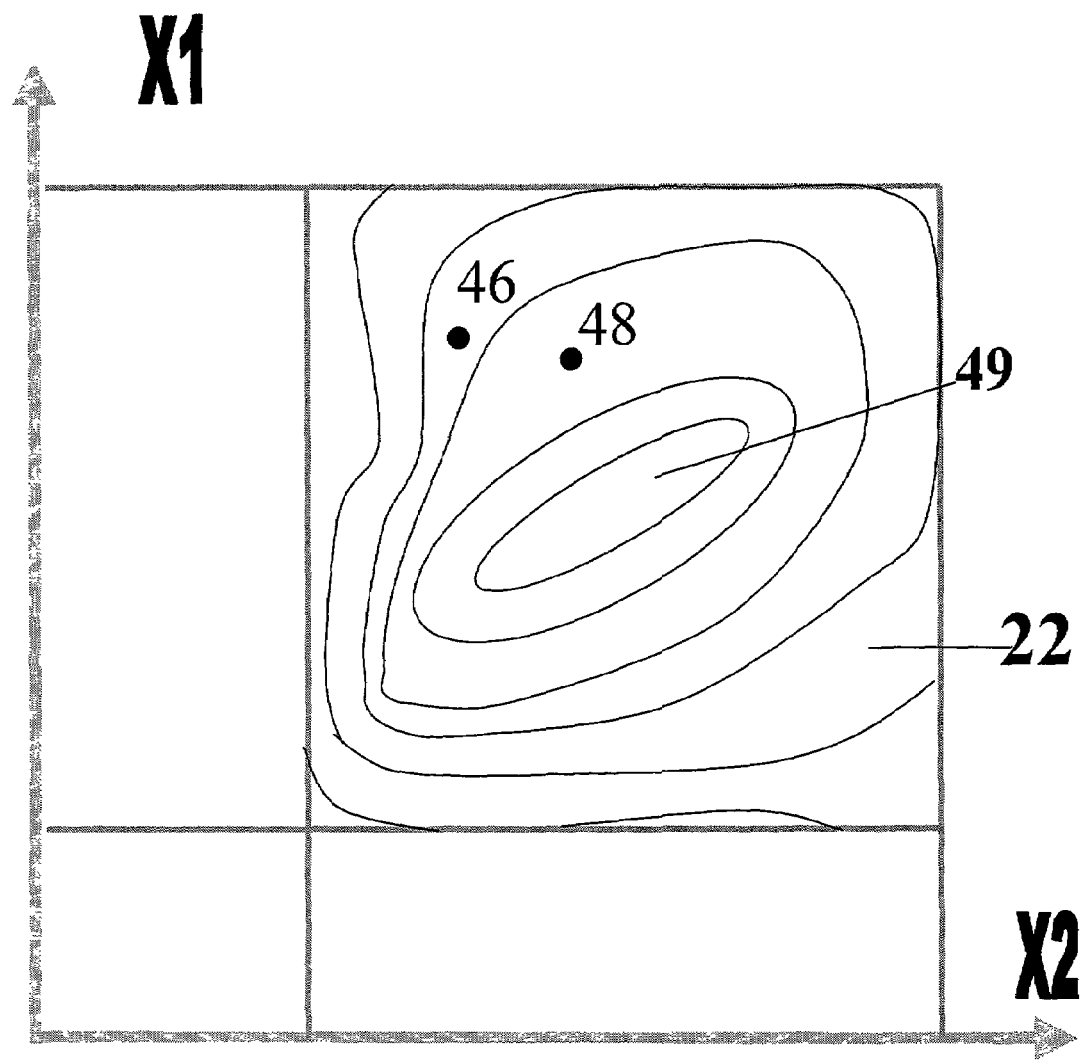
FIG. 6 is an illustration of a division of the space of FIG. 4.

Reference is made to FIG. 6, which shows another solution to the problem of insufficient learning data. The solution is realized by configuring space 22 into regions resembling a layered topographical map based upon the learning data. The shapes of the regions are influenced by the process vectors constituting the learning data and can be roughly drawn based upon few process vectors. Of course, the more process vectors that are mapped, the more detailed the shapes will be. However, an indication of the shapes can be achieved with few process vectors. Each new process vector plotted will influence the shape of the region in which it falls. One particular process vector repeatedly falling in a certain area of space 22 will substantially skew the shape of the regions.

Another method of fault indication with scant data is by judging the location of a mapped process vector. The probability of occurrence within each region is calculated as a function of the relative amount of data mapped onto the particular region compared to the total amount of data in space 22. Each new process vector is assigned a probability according to the region that it has been mapped into. The highest probability is associated with central region 49 and the regions further away from central region 49 decrease in probability. Therefore, process vector 48 that falls within a region that is closer to region 49 has a higher probability of occurrence than process vector 46 which falls within a region further from region 49.

Figure 7:
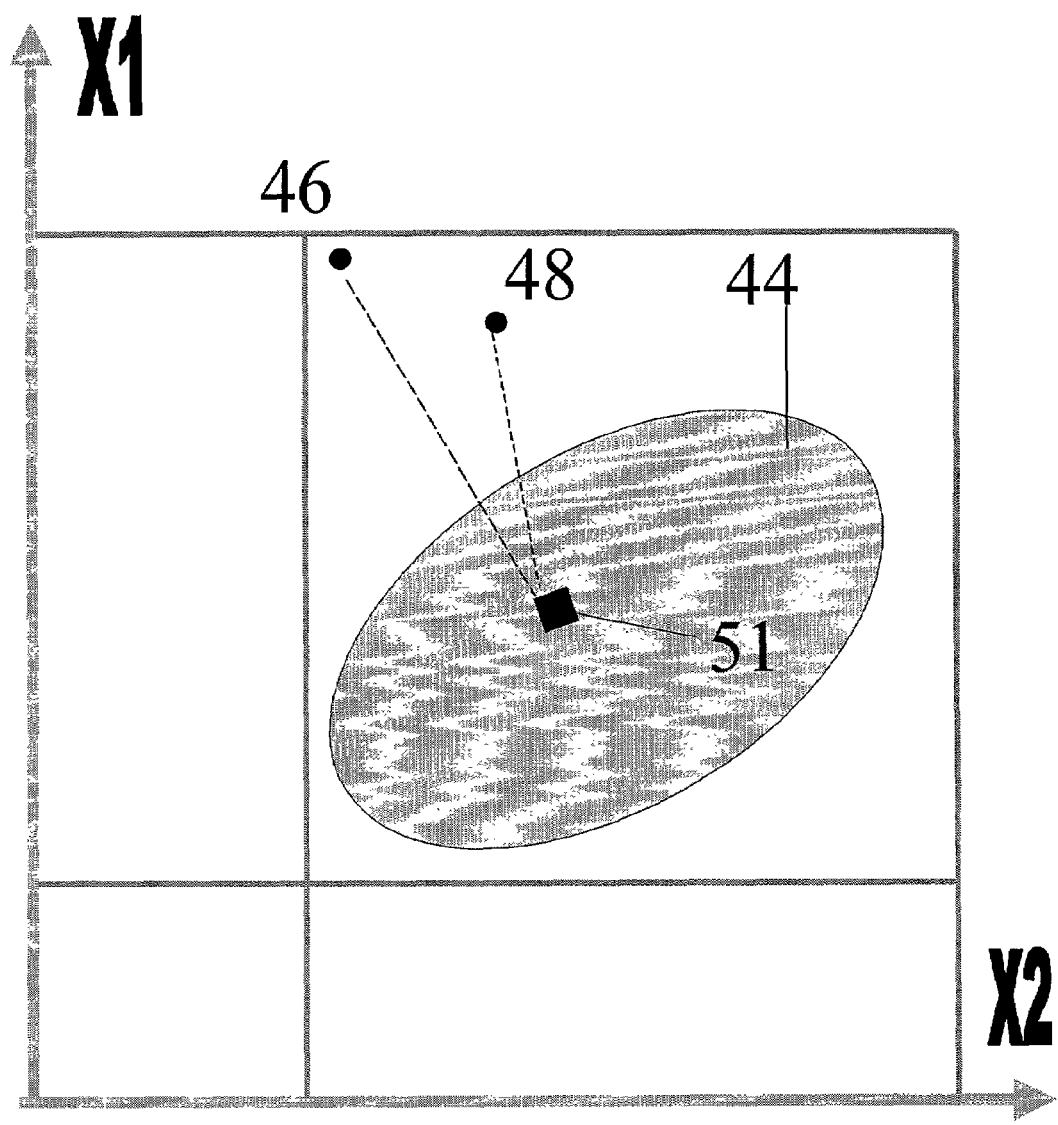
FIG. 7 is an illustration of data points within the space of FIG. 4.

Reference is made to FIG. 7. An additional method of differentiating between process vectors is by prioritizing the alert signals that they generate. Such prioritization may be done by calculating the relative distance between the mean of high probability region 44, referred to hereinafter as focus 51, and process vectors 46 and 48. One can easily measure which of process vectors 46 and 48 is further away from focus 51. Although both are below the probability threshold and will generate an alert signal, the process vector furthest away will generate a signal with a higher alert priority than the closer process vector generates. As can be seen, process vector 48 is closer to focus 51 and therefore has a higher probability of occurrence than process vector 46. In order for such prioritization to be accurate, distances must be adjusted according to the shape of the regions or based upon the dispersion pattern of the process vectors mapped onto the region. In an ellipse such as is illustrated, the distances are elliptic distances. An advantage of this configuration is that no assumption of a particular relationship between the parameters nor of any mathematical model need be made.

Just as method 1 may be used to identify a process vector that is indicating a fault and thus generating an alert signal, method 1 may also be used to make adjustments to a process in the most advantageous manner. The mapping of process vectors onto space 22 may give a visual (up to 3 dimensions) image of the process under examination. The nature of each parameter of the process is known and therefore each process vector's influence on the shape of the regions will indicate a variation in the process. Therefore, one familiar with the particular process may observe how varying the process serves to change the shape of the regions depicted in space 22 and may use this correlation in order to diagnose and to alter the functioning of the process. This remains true even when process vectors are mapped onto the layered configuration as in FIG. 6. A process vector that diverges in a certain direction will clearly indicate the element of the process that is the cause and which may be adjusted to move the process away from a fault situation.

Figure 8:
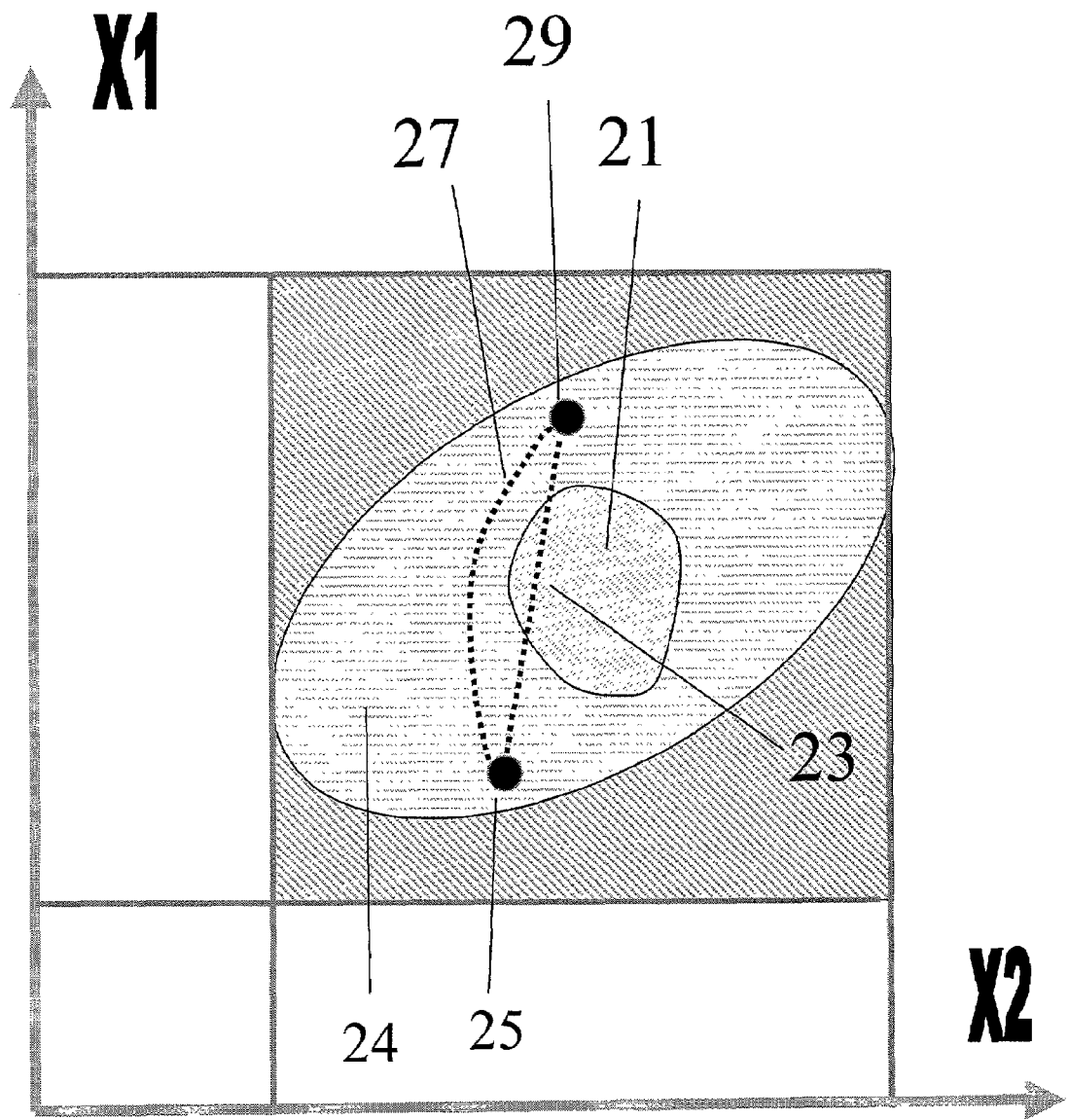
FIG. 8 is an illustration of vectors within the space of FIG. 4.

Reference is made to FIG. 8 which illustrates an example of how such an adjustment may be made. FIG. 8 depicts a space representing a process in which low probability region 21 is shown in the middle of high probability region 24. This indicates that an area of low process vector occurrence has appeared within the bounds of a high probability region. In other words, the process can be said to be operating properly when its process vectors are mapped within region 24, except when process vectors also fall within region 21. In practical terms, entry into region 21 may indicate that the process is beginning to malfunction or function in an undesirable way.

For operational reasons of no importance to the invention, a process operating such that it produces process vector 25 within high probability region 24 needs to be revised so that it operates such that process vectors will be mapped near process vector 29. The reasons for the revision could be due to process constraints or any other reason that make it advantageous for the process to operate in such a fashion.

As can be seen, the fastest way of getting from the position of process vector 25 to the position of process vector 29 is by taking route 23. However by taking route 23 the process will be traversing region 21 which may indicate a hazardous operating environment or undesirable process result. If the process operates such that its process vectors are mapped onto region 21, a process fault may be indicated and an alert signal generated. By using the teachings of this invention, the process may be adjusted to operate in such a fashion that current process vectors continue to be mapped onto high probability region 24 on the path of route 27. This mode of operation bypasses low probability region 21 and allows the process to continue to operate in such a way that its process vectors continue to be mapped within a high probability region, thus avoiding any faults.

Figure 9:
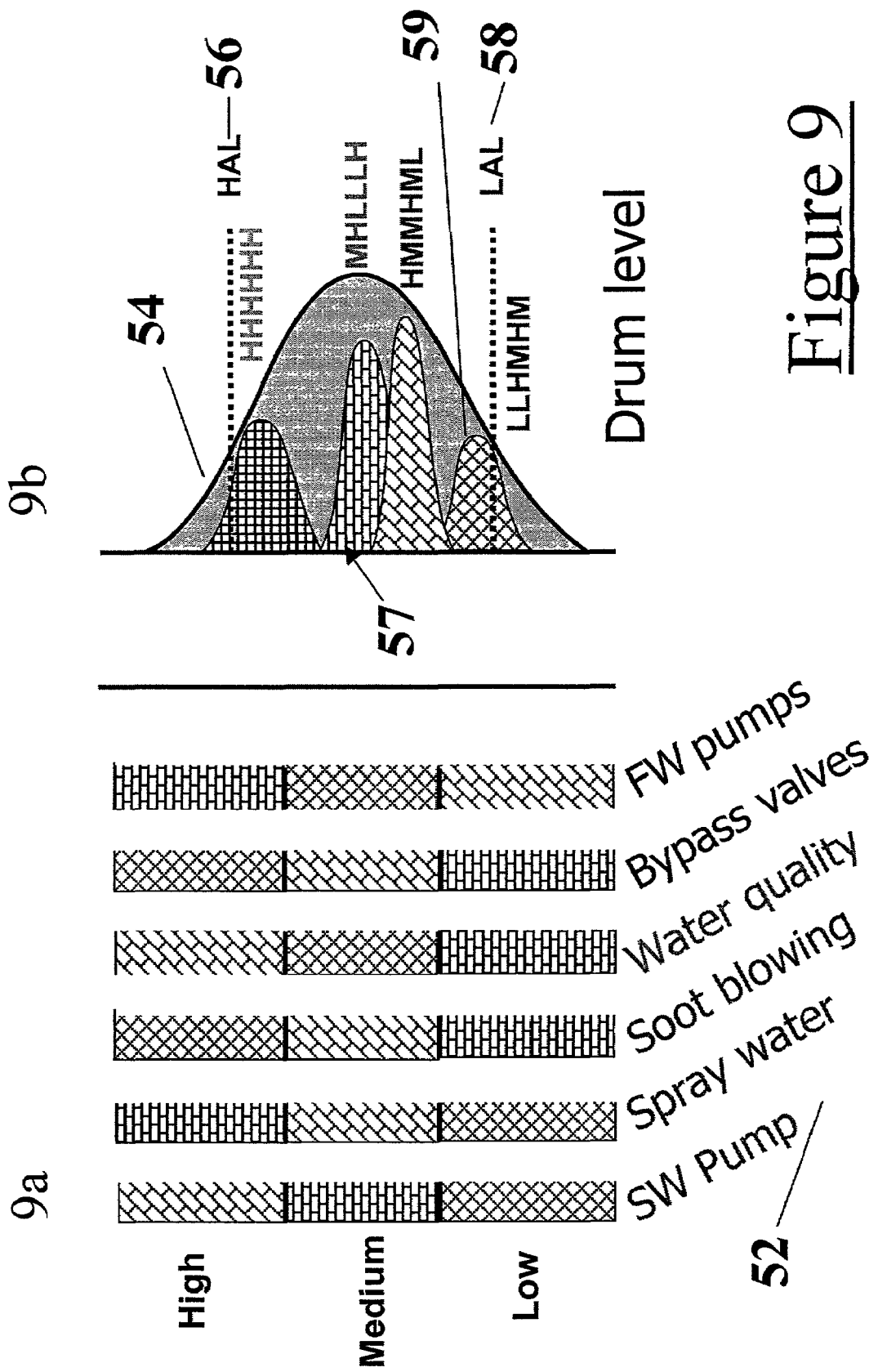
FIGS. 9a–b are graphic illustrations of six parameters of a process in accordance with embodiments of the present invention.

Reference is made to FIG. 9 which is an illustration of a further application of method 1 for identifying trends and deviations before a problem reaches a critical stage. The approach of this application is not to look at the probability of occurrence of a certain combination of parameter values or vectors that influence a process, but to study the outcome of the process as a function of the input parameters. FIG. 9*a* illustrates six influencing parameters 52 of a process, which influence the drum level in a coal fired power plant. These parameters are, in this case, Sea Water (SW) Pump, Spray Water, Soot blowing, Water quality, Bypass valves and Feed Water (FW) Pumps. The total input space of each parameter has been divided or discretized into three areas, low, medium and high. It is understood that the discretization of each parameter need not be the same, but may be into a different number of levels, and the levels may be of different ranges or contents. For example, the total range for the parameter SW Pump may be measured as between 10 and 100 units. This range is then discretized into three sub-ranges, 10–39, 40–69 and 70–100 units. The three discretized regions for each parameter are shown solely as examples of discretization and this number can vary widely from parameter to parameter. The sub-ranges may differ in size for any single parameter and can be varied as needed during the process. Moreover, a parameter may be so defined that discretization ranges are not needed, rather all parameter values are mapped directly.

The frequency of occurrence of the combinations of parameter values for these parameters are illustrated in FIG. 9*b*, which shows a distribution curve 54 reflecting the range of drum levels based upon all of the parameters combined. Curve 54 has a high alert limit (HAL) 56 and a low alert limit (LAL) 58. Any drum level value that occurs above HAL 56 or below LAL 58 will trigger an alert. On the other hand, all other drum level values that fall between HAL 56 and LAL 58 will not trigger an alert.

The discretization of the parameters enables much more precise alert creation even within the HAL 56 and LAL 58 of curve 54. An example of a discretized parameter combination is LLHMHM, which describes the process when it is run at a low value for the SW Pump parameter, a low variable value for the Spray Water parameter, a high value for the Soot Blowing parameter, a medium value for the Water Quality parameter, a high value for the Bypass Valves parameter and a medium value for the FW pumps parameter. The distribution curve 59 for this particular combination is based on data collected while the system was running using the particular parameter combination of LLHMHM. Values on either side of LAL 58 but still within the normal range of curve 59 will not trigger an alert signal for this particular combination, as such values are to be expected for this combination of parameter values. It may still trigger an alert signal for the whole system depending on the alert threshold set. Without discretization, the combination value would have triggered an alert signal.

On the other hand, while running the same combination of parameter values of LLHMHM, a value 57 of drum level which falls within curve 54 and seemingly ideally positioned in the middle of the distribution range for all of the combinations, would in fact trigger an alert signal as point 57 is outside of curve 59 which is the expected range for this particular combination of parameter values. This discretization of the parameters permits a more precise prediction of an incipient fault.

Figure 10:
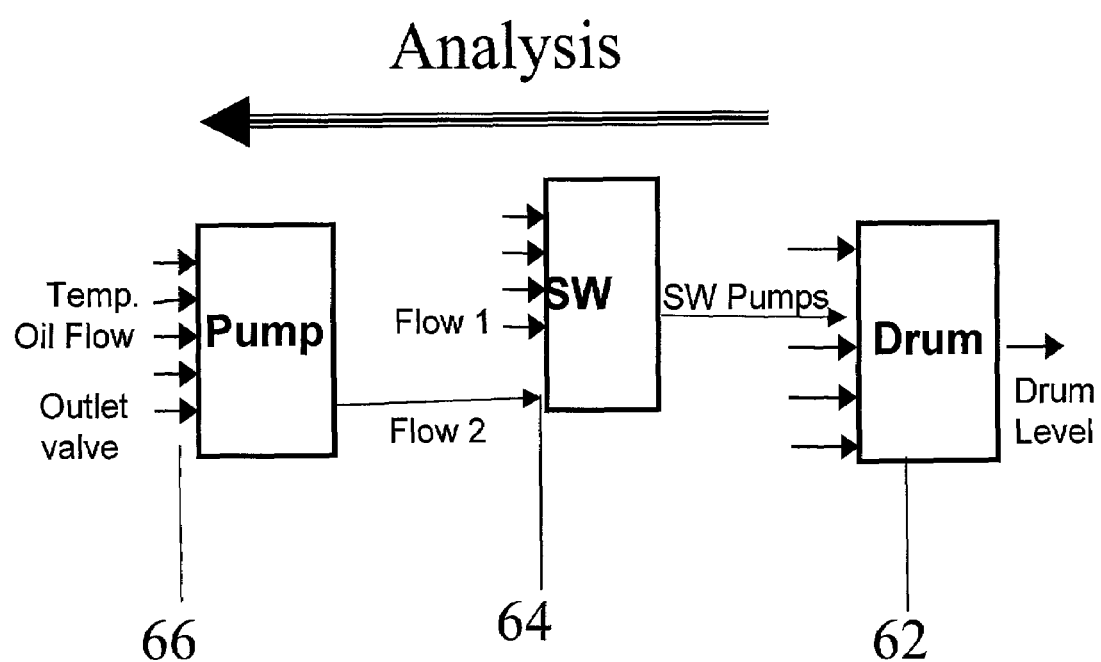
FIG. 10 is a block diagram of a Knowledge Tree representing variable parameters of the process of FIG. 9.

Reference is made to FIG. 10. It is understood that processes to which method 1 is applicable may have many parameters generating large numbers of parameter values. For a better understanding of a process under analysis, particularly one in which the number of parameter values and their sub values is too large for easy distribution into areas and sub-areas, the parameters may be organized into a Knowledge Tree (KT) with multiple cells and multiple layers. The KT model represents a breakdown of a process into intermediate process stages. The outputs of the lower intermediate stages become the inputs, or parameter values, of the stage above it in the hierarchy of the KT. In practice, such cells and layers are created using expert advice in order to break down the process into appropriate stages according to its physical and/or logical aspects, each stage being represented by a cell or a layer. Experts determine which of the parameters are relevant in a particular process or stage of a process. Models are then created for these cells that describe the relationship between the inputs and the outputs of the individual cells. As the process proceeds, newly measured data can validate the real influence that each parameter has on the process.

If models cannot be built for some particular cells individually then Patent . . . describes a method for building models of an entire or part of a knowledge tree. According to this concept, the outputs of subcells are virtual and therefore not measurable. After all the models have been placed and as the process proceeds, newly measured data can validate the real influence that each parameter has on the process. This method is described in detail in patent application Ser. No. 09/731,978, which is incorporated herein as if fully set forth.

Once a KT is generated, the same fault detection and alert signal generation that has been described hereinabove with respect to an entire process can be applied to intermediate stages of the process, which are represented by individual KT cells. Each cell that has a number of inputs and an outcome can be analyzed using this technique.

These cells higher in the hierarchy use the same methodology as described hereinabove with respect to FIG. 9.

Faults will then be detected when a certain combination of inputs yields an outcome that has a low probability.

The KT model provides a way to diagnose the probable cause of a fault in a process. The root source of the fault can be pinpointed by determining which of the individual parameters or which combination of parameters are causing the process to drift in a particular direction. This can be particularly effective when there are models that describe the relationships between the inputs and the outputs of the various KT cells.

FIG. 10 illustrates the process of a typical power plant which has been broken down into three stages of the process. The three stages are represented by knowledge tree cells 62, 64 and 66, which correspond to sub-processes Pump, SW and Drum respectively. As can be seen, Pump is an intermediate stage of SW, which, in turn, is an intermediate stage of Drum.

A fault in the system, caused by a parameter value of the output of the Drum stage, which is the highest tier in the knowledge tree, is traced backwards through the tiers. Alternately or additionally, a fault can be activated at ant stage in the process. In the Drum stage, represented by KT cell 66, the input SW Pumps was identified as the parameter indicating a fault. An analysis was then made of the SW stage, represented by KT cell 64, that has as its output SW Pumps. It was found that the input parameter indicating a fault was in Flow 2. An analysis was then made of the Pump stage, represented by KT cell 62, that has as its output Flow 2. It was diagnosed that a combination of input parameters to the Pump was indicating a fault. By applying method 1 to this combination, it can be determined which of the input parameters caused the fault by looking for any trends in the incoming data. For example, the mapping of the parameter values of the temperature, the oil flow and the outlet valve might indicate that the temperature had not been within its permitted limits. It is understood that not all processes are equal in complexity to the example given. In a simpler process, the parameter indicating a fault in a process stage may be a single input, or in a closer process stage. In a more complex process, there may be many more stages or inputs into each stage.

By measuring each variable input on a constant basis and mapping or otherwise analyzing the data, an overseer of a process may both recognize a situation where the process is heading towards a problem while it is still apparently working normally and identify the cause of the fault.

A further advantage of method 1 is predictive or individualized maintenance that can be performed on a process or a product such as a car or an airplane which, upon manufacture, has been assigned a level of periodic maintenance for all of it functional elements. Predictive maintenance can be used to replace or supplement such periodic maintenance.

In most manufacturing processes, new products differ only slightly from each other at the outset and therefore, a standardized maintenance schedule is appropriate. However, upon use or operation, there may be differences that cannot be taken into consideration by such periodic maintenance schedules. For example, all automobiles have their own individual driving history. Some are driven on rough roads while others are driven on smooth highways. Some are driven very fast and others never exceed inner city speed. Some are used in hot or humid areas and others in cold or wet or harsh environments and others in both hot and cold. It is clear that such differences will produce different wear and tear characteristics, which require different types of oversight. If sensors of an automobile were to be able to detect these environmental and driver specific parameters and combine this unique data with the other customary automobile parameters, a personal predictive maintenance schedule could be undertaken as an extension of fault detection. Method 1 is able to take all of such parameters into consideration and enable the prediction of individualized maintenance which must be performed in order to avoid any faults or even any drifting toward faults.

A particularly advantageous application of method 1 may apply to aircraft maintenance. For example, the FAA mandated maintenance of a particular engine could potentially be too late or too early, in light of factors relating to a specific aircraft's operation. An aircraft specific maintenance schedule, based upon the operation of each specific aircraft, will clearly be advantageous. It may, on the one hand, prevent malfunctions, potentially saving lives. On the other hand, delaying expensive maintenance which is not yet necessary may considerably reduce maintenance costs.

Figure 11:
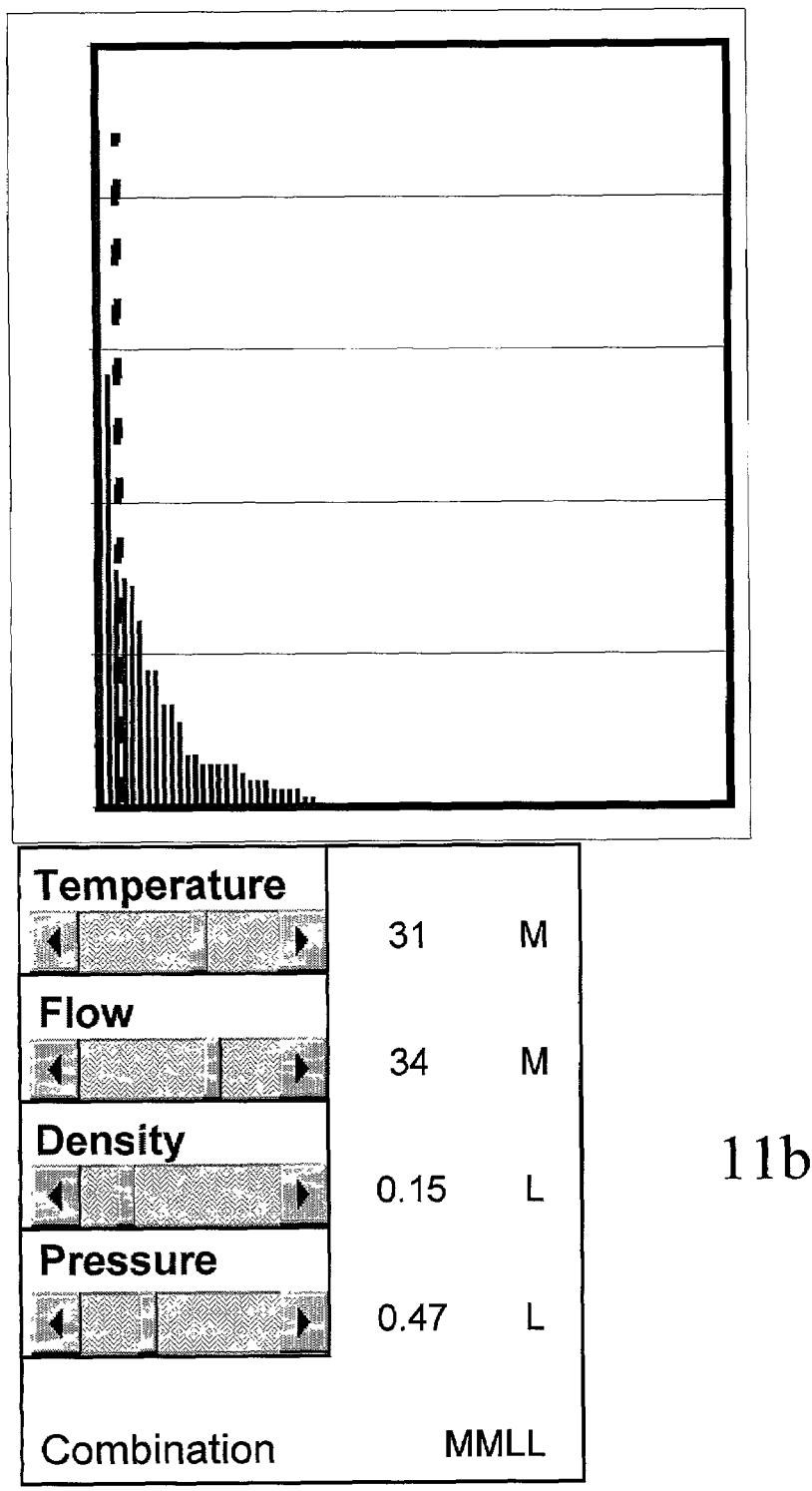
FIGS. 11a–b are illustrations of an alert generation method in accordance with embodiments of the present invention.

A further advantage of method 1 is the ability to provide an early warning of fault occurrence. FIG. 11 illustrates a model of alerting based upon the probability of a fault occurring. In this model, a histogram 11a is built based on actual data. The data is derived from the parameters of a process, with each parameter being assigned a discretized value. Combining the parameter values at any given time yields a vector indicating the current probability of a fault occurring in the process, expressed as a percentage of the likelihood of occurrence.

In the illustrated example, the model measures the probability of occurrence of a combination of four parameters, each defined according to a discretized range of low, medium or high. As shown in FIG. 11b, the parameters and their values are Medium Temperature, Medium Flow, Low Density and Low Pressure, yielding a vector of MMLL. In this example, the probability of MMLL is approximately 7%.

This information can be derived from the "Process Output Empirical Model" (POEM) as described in patent application Ser. No. 09/689,884, which is incorporated by reference herein as if fully set forth. According to this model, when a new datum point is measured, it can be classified according to its corresponding vector such as MMLL. The new point is automatically assigned a probability of occurrence accordingly. An alert will be activated when the new point belongs to a vector below a predetermined alert threshold. This model, as the others hereinbefore described, does not require the assumption that the behavior of the data is according to a linear relationship or to a mathematical model.

Figure 12:
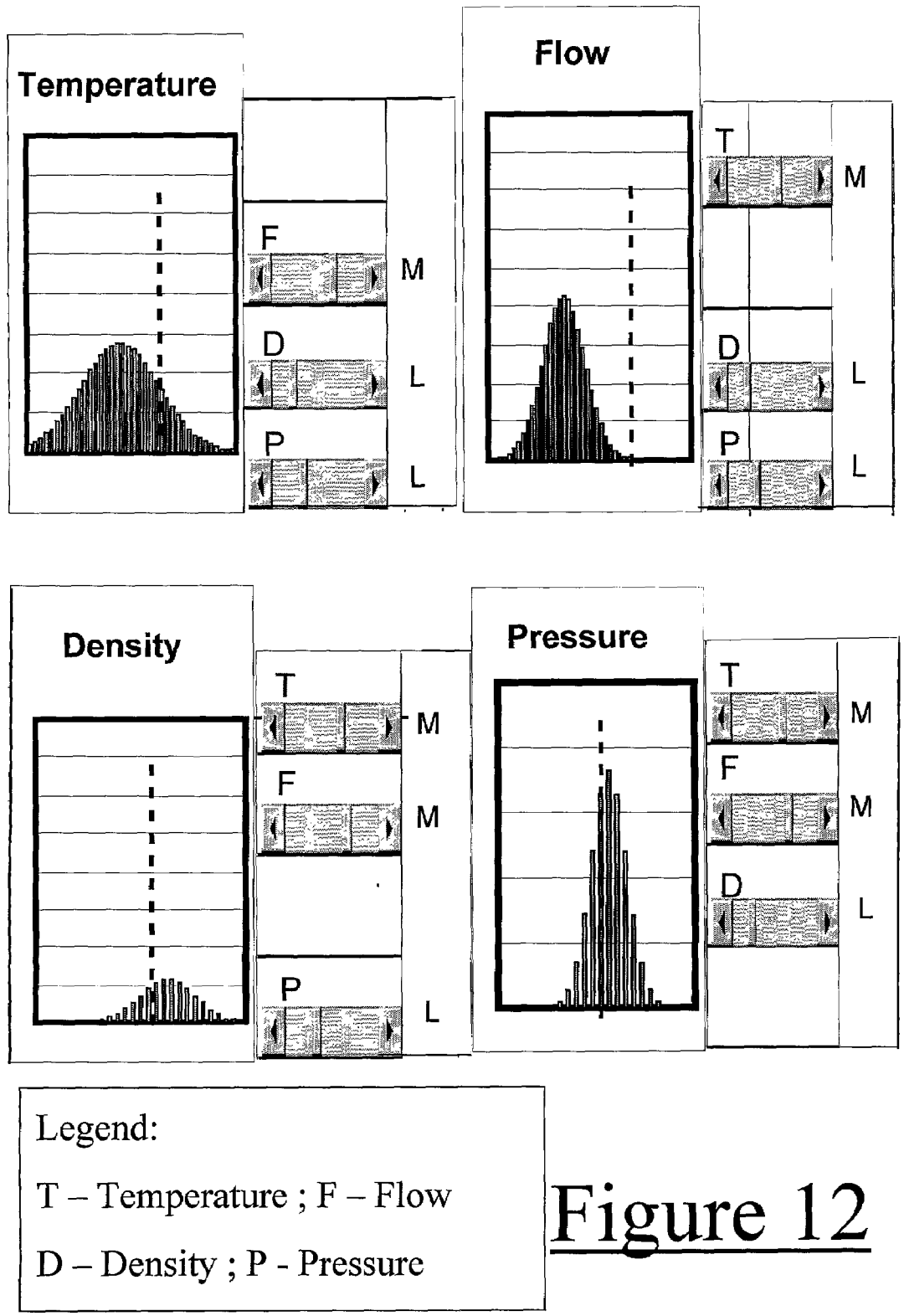
FIG. 12 is an illustration of another alert generation method in accordance with embodiments of the present invention.

Reference is made to FIG. 12 which shows each of the four parameters of FIG. 11 taken as a function of the other 3 parameters, thus enabling a pinpointed analysis of fault detection by evaluating the behavior of each parameter individually and comparing it to the remaining parameters combined. In a normally functioning process, the performance of each parameter will fall within the normal range of the combined performance of the other parameters. This approach provides an early warning of a system fault by providing for the early detection of a cause of the fault situation, which is typically found in one parameter. Moreover, as described with respect to FIG. 9, this approach also provides identification of the parameter that is the cause of the fault.

As shown in each of the four graphs illustrated, one of the parameters is plotted against the combined performance of the other three parameters. For example, in the graph entitled "Temperature", the Temperature distribution for specific values of Flow, Density and Pressure is plotted as a distribution curve. An actual Temperature parameter is plotted as a vertical line falling along the horizontal axis representing its performance with relation to the curve. As can be seen, the Temperature parameter value, indicating the current actual measurement of the temperature, falls within the normal distribution curve as expected, indicating that the temperature is also functioning within normal limits. In the graph entitled "Flow", the Flow parameter is shown in comparison to its normal distribution for specific values of the other three parameters. The graph shows the distribution curve representing the normal Flow behavior for specific Temperature, Density and Pressure values. The actual Flow is shown plotted as a vertical line off to the right of the curve. Because the Flow parameter value does not appear within the normal distribution curve, a fault is indicated, requiring investigation of a possible malfunction of the flow.

FIGS. 13a–e illustrate a different model of indicating fault situations using the method of the present invention. The figures show the application of this model to a sea water pumping station which is part of the cooling system of a power plant. Parameters relating to the water level entering the pumping station are combined with the normal parameters customarily associated with a pumping process, such as motor function, flow rate, etc. in order to provide a more comprehensive monitoring function over the pumping station. FIGS. 13a–e deal specifically with the water level parameter.

Figure 13A:
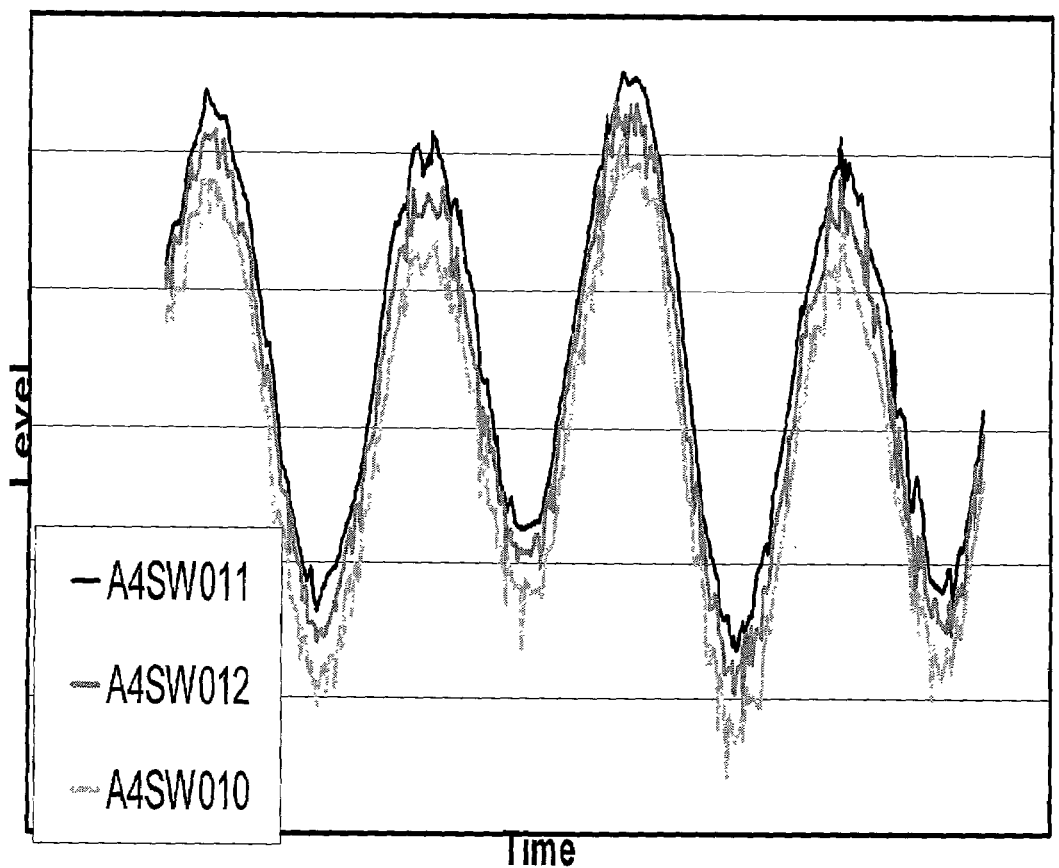

FIG. 13a illustrates a two dimensional graph defined by two variable and linearly related parameters, water level measured by a scale on the left vertical axis, and time represented on the bottom horizontal axis, a forty eight hour trend of time being shown. Plotted with reference to those axes are three levels of sea water used to cool the power plant. The data plotted highest on the axis, referred to as level 011, depicts normal sea level; the data plotted midway on the axis, referred to as level 012, depicts the level following coarse filtration of the sea water; and the data plotted lowest on the axis, referred to as level 010, depicts the level following fine filtration of the sea water just prior to entering the pump. The wave form of the forty eight hours trend reflects the tidal movement of the sea.

The normal water levels of a pumping station are known from the historical information which constitutes the learning data. Therefore, it should be a simple matter to set high and low alert thresholds based upon the requirements of the pumping system, as it is known that a level too high or too low will endanger the pump structure. However, the large oscillations of water levels due to tidal movement prevent the possibility of setting constant or precise high and low alert threshold limits. Therefore, water level alone is not an adequate fault predictor.

Figure 13B:
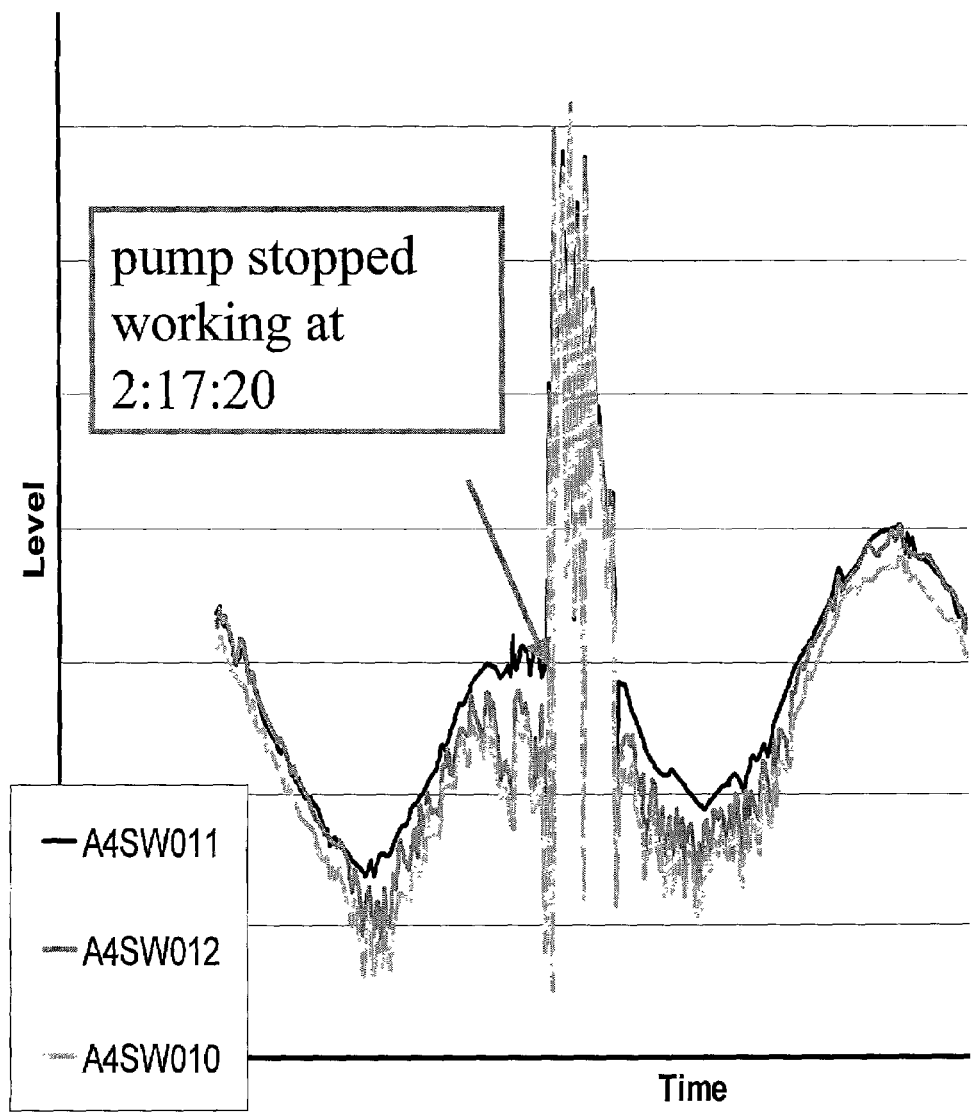

FIG. 13b illustrates a real case of blocked filters causing a system breakdown, in this case indicated by the pump shutting down, or tripping. As can be seen, the graph reflects that at time 2:17:20 the water levels increased dramatically. This was predetermined to be a fault situation and therefore triggered an alert signal. Upon investigation, it was found that the pump had tripped, causing a back-flow of water into the reservoir, raising its level.

Reference is made to FIG. 13c which illustrates a graphic representation of an ongoing analysis of the sea water levels. The graph depicts the state probability level of an imminent fault, the term "state probability" meaning the degree of likelihood of a fault occurring. A vertical axis is added to the right side of the graph with a measuring scale indicating state probability, expressed in percentages of likelihood. Two months of normal system behavior history was studied and analyzed. From this data, values indicating degrees of deviation from normal behavior were determined by comparing the incident data with the normal behavior data. The degrees of deviation indicating state probability are plotted on the graph by probability line X.

According to the deviations plotted, probability line X reduced to 0% at time 0:35, indicating a fault, which provided an alert signal 1:42 hours ahead of the pump trip. It can also be seen that probability line X almost dipped to 0% at about 8 hours ahead of the pump trip. Had an alert threshold been set at this level, a warning eight hours in advance of the incident would have been given. However, for operational reasons, the threshold is set at 0%. It can also be seen that the situation was not completely rectified until 8 hours following the trip as illustrated by probability line X moving up to 15%.

Figure 13D:
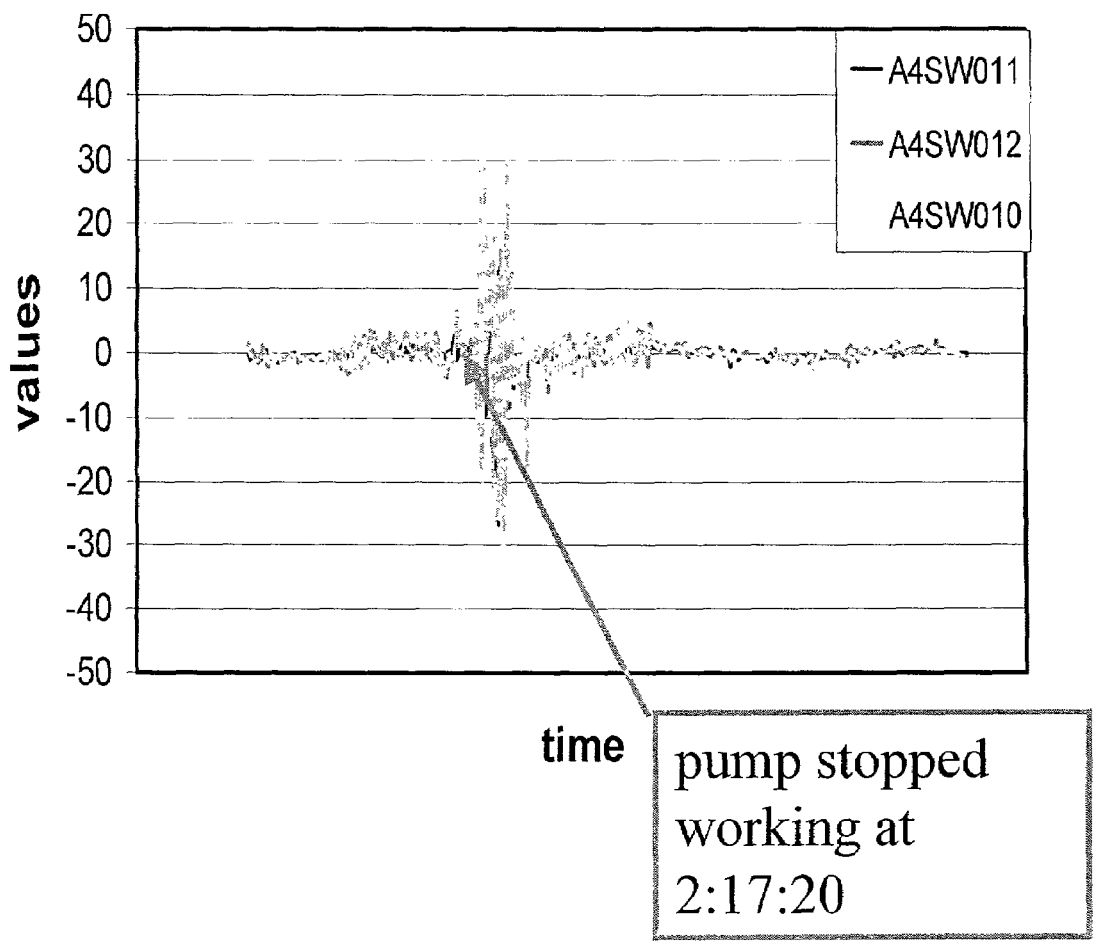
Figure 14:
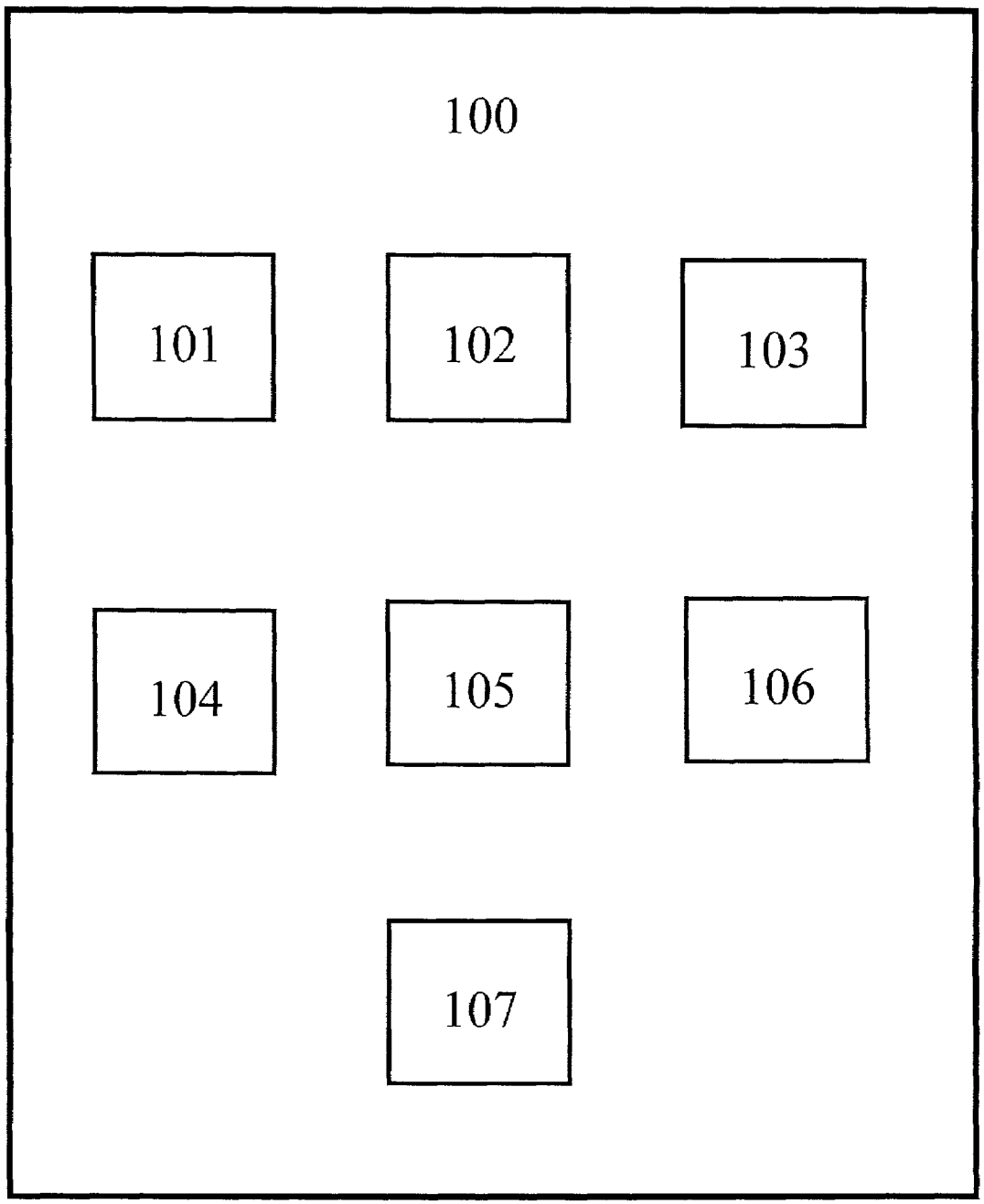
FIG. 14 is a simplified block diagram of an apparatus for providing an early warning of an abnormal situation in accordance with embodiments of the present invention.
Figure 15:
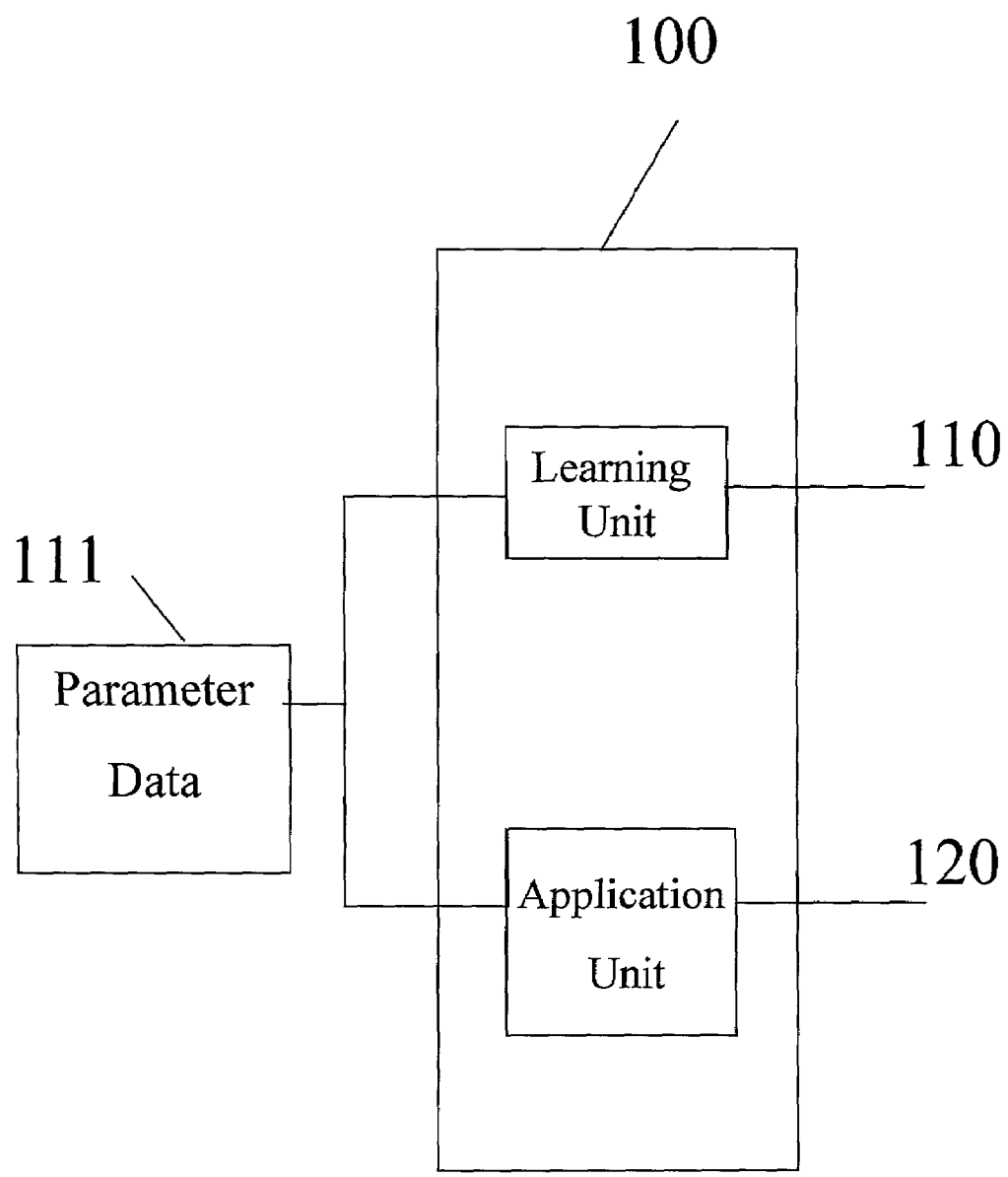
FIG. 15 is a block diagram of one unit of the apparatus of FIG. 14.
Figure 16:
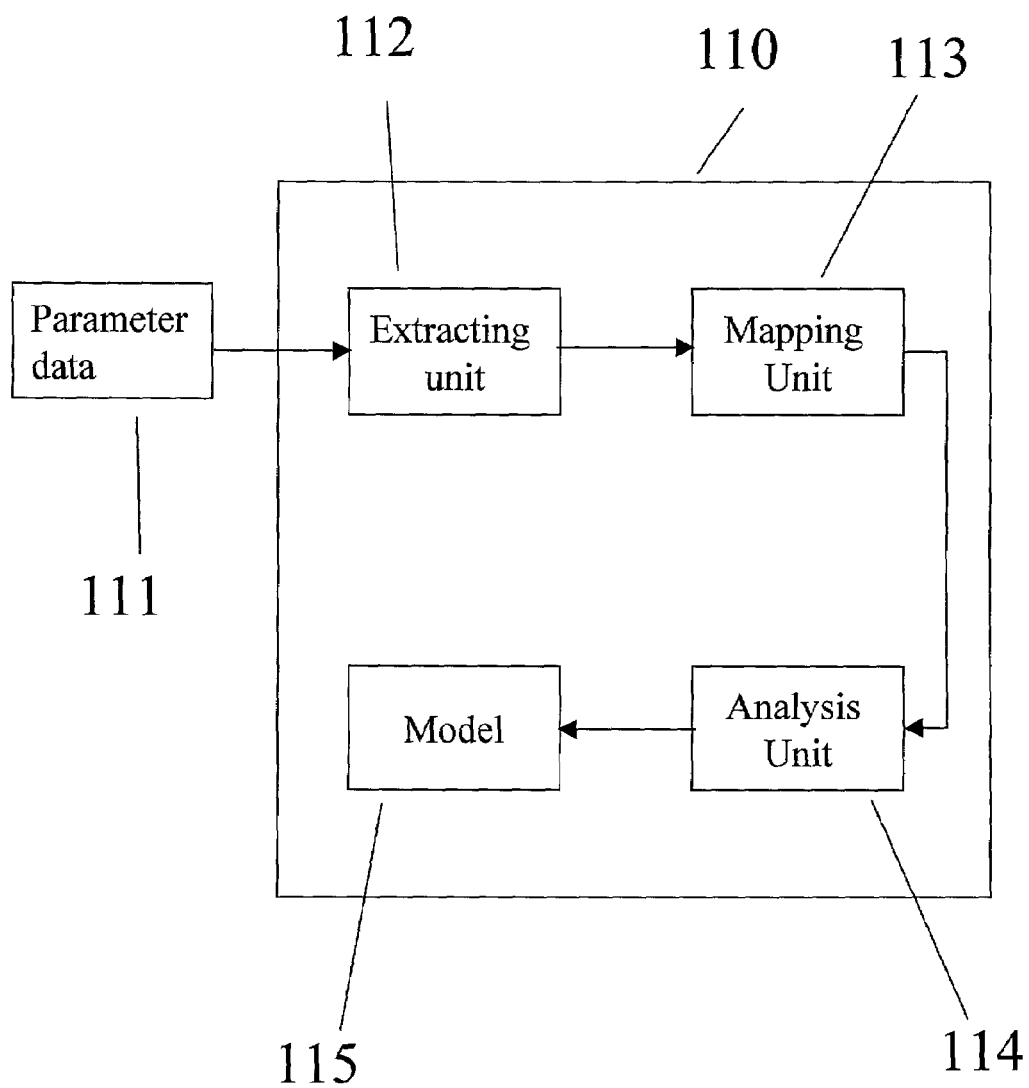
FIG. 16 is a block diagram of another unit of the apparatus of FIG. 14.
Figure 17:
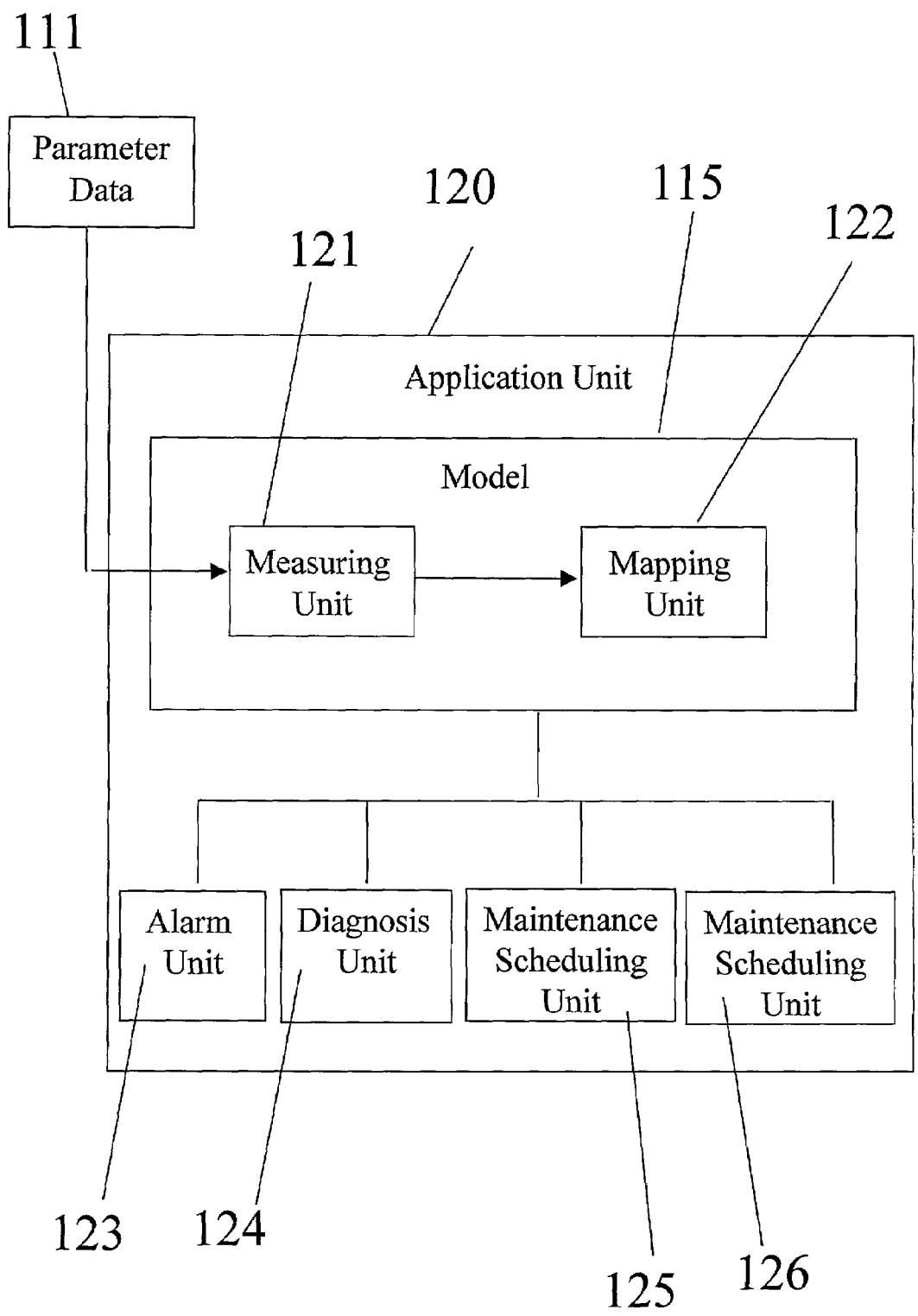
FIG. 17 is a block diagram of another unit of the apparatus of FIG. 14.

FIG. 13d illustrates the same incident as illustrated in FIG. 13b. However, the influences of the tidal movements were filtered out leaving only the high frequency wave movements to appear on the graph. This is a "cleaner" way to observe the water levels, without distracting tidal influence. By repeating the same analysis methodology as was shown in FIG. 12c on these "cleaner" tideless water levels, a more precise reading of fault probability may be made. FIG. 13e shows probability line X falling to 0% 6:07 hours before the pump trip. Apparently, this reading was hidden by the fluctuations in level caused by the tidal movement. Removing this parameter from the combination allowed a more precise analysis of the data and resulted in a fault being indicated well in advance of the system breakdown, a three fold improvement over raw data analysis.

Having described method 1, we now describe an apparatus for generating an early warning of an abnormal situation in a multivariate process using method 1.

Reference is made to FIGS. 14, 15, 16 and 17 which together illustrate an apparatus for generating an early warning of an abnormal situation in a process in accordance with the present invention, hereinafter referred to as apparatus 100. No details of design, configuration or construction are provided, as apparatus 100 is susceptible to implementation in many different ways based upon existing technology available in the marketplace. One of ordinary skill in the art will find little trouble implementing the apparatus described herein in the appropriate embodiment required for the process under examination.

Apparatus 100 comprises a learning unit 110 for developing a model 115 of a process which serves as the basis for evaluating future process parameters to determine if they indicate a fault situation. Apparatus 100 also comprises an application unit 120 for evaluating the process.

Learning unit 110 includes a number of functional units. The first is an extracting unit 112 for extracting parameter values from parameter data 111 relating to process parameters. Parameter data 111 may consist of prior parameter values stored in a database or may be parameter values gleaned by measurement. Extracting unit 112 is for extracting data from at least one parameter to determine its value at any given time. It is understood that apparatus 100 is a highly versatile apparatus capable of many different designs and configurations and capable of being applied to many different processes with widely diverging parameters. For example, parameters may be process inputs, process outputs, intermediate values of any aspect of a process or even virtual parameters of a process determined by extrapolating actual parameters of the process. Moreover, parameters may not have any definable relation to each other. They may not have a linear relationship, an inverse relationship or any other mathematically defined relationship. Accordingly, extracting unit 112 may include the appropriate devices and tools as may be necessary to extract the different parameters of the process under examination and, preferably, to divide each parameter into discrete value segments so that they may be applied to the space representing the process.

Learning unit 110 also includes a mapping unit 113 for mapping the parameter values extracted onto a defined space representing the process under examination.

Learning unit 110 also includes an analysis unit 114 for defining the space representing the process. The space will have at least two and perhaps many more dimensions, each dimension representing a parameter of the process. Analysis unit 114 is for analyzing the process and may do this by analyzing the mapping either statistically or empirically. Analysis unit 114 applies the analysis to the space in order to determine the probability of future parameter values falling with any given location within the space. In order to do this, analysis unit 114 divides the space into regions of high and low probability of occurrence based on parameter data 111 and assigns a probability value of a future parameter value falling therein. This analysis and the definition of the high and low probability regions forms a model 115 of the process. It is understood that the formation of model 115 may be an ongoing process, being updated periodically with new parameter values or other information that may be deemed relevant to the process. It is further understood that model 115 may be based upon regions of high and low probability of occurrence predesignated by process engineers.

Apparatus 100 also comprises an application unit 120 for evaluating the process based upon the model formed. Application unit 120 includes at least one measuring unit 121 for measuring at least one parameter to determine at least one parameter value. In practical effect with respect to most processes, measuring unit 121 will preferably perform periodic or ongoing measurement of parameters in order to monitor the functioning of the process. It is understood that the frequency and nature of the measurements may vary widely, as may be appropriate to the process under examination. Measuring unit 121 also functions to form at least one parameter vector for mapping based upon the at least one measured parameter value.

Application unit 120 also includes a mapping unit 122 for mapping the measured parameter values onto model 115. By such mapping, each parameter may be tested to determine if its current value falls within a high or low probability region of the model. If a parameter value is mapped by mapping unit 122 within a low probability region, or in any other location of the model deemed by the process overseer to constitute a fault situation requiring a response, alert unit 123 will preferably generate a signal calling attention to the fact that a fault situation exists. Alert unit 123 may be of any type known in the art and may generate a signal that is audible, visible or otherwise perceptible. The signal may be a siren, bell or other warning sound, or may be a flashing light, an LCD or other illuminated element of a control console, or the like. Personal auxiliary versions of alert unit 123 may be provided so that individuals may be individually and discreetly alerted as by a tactile signal from a small unit in their pocket.

Another response if a parameter value is mapped by mapping unit 122 within a low probability region, or in any other location of the model deemed by the process overseer to constitute a fault situation requiring a response, may be to trigger process adjustment unit 126 that may serve to shut down the process or make any other adjustments that may be deemed to be an appropriate response to the fault detected. Such responses may vary from a simple termination of the process to a wide range of responses by different elements of the process, as may be indicated by the nature of the fault. Process adjustment unit 126 uses the probability regions, and the process vectors mapped therein, to guide a user in making adjustments to a process in order to avoid or correct a fault situation. The space representing a process as constructed pursuant to method 1 provides a visual reference for a user to see the effects of adjustments to the process. Accordingly, the direct feedback provided by adjustment unit 126 allows a user to vary process parameters to achieve the desired effects, such as moving the process away from a hazardous operating environment, etc.

Another element included in application unit 120 may be diagnosis unit 124 which evaluates one or more of the component elements of the parameter causing the fault situation for the purpose of providing associations between parameters and between elements of parameters in order to identify the causes the fault, ultimately to pinpoint its root cause. Diagnosis unit 124 may preferably allow a user to select a parameter and examine the associated component parameters that combine to produce the measured parameter value in order to identify causes of abnormal situations in a process. This type of breakdown analysis may be used to find the cause of a breakdown with precision so that the fault may be corrected effectively and efficiently. This breakdown analysis may be used in succeedingly lower levels of components of parameters and sub-parameters.

Application unit 120 may also preferably include a maintenance scheduling unit 125 for monitoring the parameter values measured in order to schedule maintenance of the process. The maintenance schedule may be developed based upon a probability determination made by analysis unit 114 or may be made based upon observing the movement of the parameter values within the space representing the process.

In summary, method 1 and, consequently, apparatus 100 for implementing method 1, provide many advantages over the prior art methods of early warning of abnormal situations, fault cause analysis and detection, fault prevention.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather, the scope of the present invention is defined by the appended claims and includes both combinations and subcombinations of the various features described hereinabove as well as variations and modifications thereof which would occur to persons skilled in the art upon reading the foregoing description. Accordingly, it is intended to embrace all such alternatives, modifications and variations that fall within the spirit and broad scope of the appended claims.

What is claimed is:

1. A method of providing an early warning of an abnormal situation in a process, said process being subject to influence by at least two parameters, said method comprising:
 i. defining a space representing said process, said space comprising at least two dimensions, each dimension representing a measurable varying parameter of a component of said process;

ii. applying an analysis of said parameter values of said process to said space in order to define regions of high and low probability of occurrence within said space;
iii. measuring said parameters to determine current values thereof;
iv. mapping said measured said parameter values onto said space; and
v. generating a signal indicating an abnormal situation whenever said mapped said parameter values indicate drifting toward a region of lower probability.

2. The method of claim 1, further comprising dividing said parameter values into discrete value segments and dividing said space into discrete areas, and using said value segments to assign priority values to each of said areas.

3. The method of claim 1, wherein said application of analysis of parameter values is ongoing and at least some of said regions of high and low probability of occurrence are continually adjusted.

4. The method of claim 1, wherein at least some of said regions of high and low probability of occurrence are predesignated.

5. The method of claim 1, further comprising providing associations between said parameters by allowing a user to
   i. select a mapped parameter;
   ii. examine selected ones of associated parameters;
   iii. examine further selected parameters associated with said selected parameters; thereby to identify causes of said abnormal situations.

6. The method of claim 1, wherein said process is subject to influence by at least three parameters, and said space comprises at least three dimensions, each dimension representing a parameter of said process.

7. The method of claim 1, wherein said process is subject to influence by four or more parameters, and said space comprises four or more dimensions, each dimension representing a parameter of said process.

8. The method of claim 1, wherein said process is subject to influence by ten or more parameters, and said space comprises ten or more dimensions, each dimension representing a parameter of said process.

9. The method of claim 1, wherein said process is subject to influence by at least one virtual parameter.

10. The method of claim 1, wherein said parameters comprise at least one of a group consisting of process inputs, process outputs and intermediate values derived from said process.

11. The method of claim 1, wherein a relationship between said parameters is non-linear.

12. The method of claim 1, wherein said analysis is an empirical analysis.

13. The method of claim 1, wherein said analysis is a statistical analysis.

14. The method of claim 1, wherein said signal is visible or audible.

15. The method of claim 1, wherein said signal is an interruption of said process.

16. The method of claim 1, wherein said signal is a variation of said process.

17. A method of providing an early warning of an abnormal situation in a multi-parameter process, said method using a model of said process, said model comprising a defined space representing said process, said space having defined therein regions of high and low probability of occurrence of values of said parameters, said method comprising:
   i. measuring two or more varying parameters of a component of said multi-parameter process to determine current values thereof;
   ii. forming said current values into process vectors for mapping;
   iii. mapping said process vectors onto said model; and
   iv. generating a signal indicating an abnormal situation whenever said process vectors are mapped drifting toward a region of lower probability.

18. The method of claim 17, wherein a range for said current values is divided into at least a high and low region.

19. The method of claim 17, wherein said parameters comprise at least one of a group consisting of process inputs, process outputs and intermediate values derived from said process.

20. The method of claim 17, wherein said signal is visible or audible.

21. The method of claim 17, wherein said signal is an interruption of said process.

22. The method of claim 17, wherein said signal is a variation of said process.

23. The method of claim 17, wherein the mapping of the process vectors of at least some of said parameters onto said space is used to determine a maintenance schedule for the process.

24. The method of claim 23, wherein a probability calculation is used to determine frequency of maintenance.

25. The method of claim 23, wherein said mapping is repeatedly carried out, the movement of the process vectors within said space being used to determine frequency of maintenance.

26. In a process subject to influence by at least two parameters, each of said parameters having a range of discrete values, a method of providing an early warning of an abnormal situation in said process caused by at least one parameter of said process, said method comprising:
   i. defining a space representing said process, said space comprising at least two dimensions, each dimension representing a measurable varying parameter of a component of said process and being divided into discrete areas corresponding to said discrete values of said parameter, thereby to discretize said space;
   ii. applying an empirical analysis of said process to said discretized space in order to define discrete regions of high and low input probability within said space, or to define normal and abnormal values within said range of discrete values of at least one of said parameters;
   iii. measuring said parameters to determine current values thereof and forming process vectors based upon said measured parameter values;
   iv. mapping said process vectors onto said space; and
   v. generating a signal indicating an abnormal situation whenever said process vectors are mapped drifting toward a discrete region of lower probability.

27. The method of claim 26, wherein said application of said empirical analysis is ongoing and said discrete regions of high and low input probability are continually adjusted.

28. The method of claim 26, wherein said process is subject to influence by at least three parameters, and said space comprises at least three dimensions, each dimension representing a parameter of said process.

29. The method of claim 26, wherein said process is subject to influence by four or more parameters, and said space comprises four or more dimensions, each dimension representing a parameter of said process.

30. The method of claim 26, wherein said process is subject to influence by ten or more parameters, and said space comprises ten or more dimensions, each dimension representing a parameter of said process.

31. The method of claim 26, wherein said process is subject to influence by at least one virtual parameter.

32. The method of claim 26, wherein said parameters comprise at least one of a group consisting of process inputs, process outputs and intermediate values derived from said process.

33. The method of claim 26, wherein the relationship between said parameters is non-linear.

34. The method of claim 26, wherein said signal is visible or audible.

35. The method of claim 26, wherein said signal is an interruption of said process.

36. A method of providing an early warning of an abnormal situation in a process, said process being subject to influence by at least two parameters, said method comprising:
   i. defining a space representing said process, said space comprising at least two dimensions, each dimension representing a parameter of said process;
   ii. applying an analysis of parameter values of said process to said space in order to define regions of high and low probability of occurrence within said space;
   iii. measuring said parameters to determine current values thereof;
   iv. mapping said measured parameter values onto said space;
   v. generating a signal indicating an abnormal situation whenever said measured parameter values are mapped into a region of low probability of occurrence; and
   vi. providing associations between said parameters by allowing a user to perform the steps of:
     a. select a mapped parameter;
     b. examine selected ones of associated parameters; and
     c. examine further selected parameters associated with said selected parameters; thereby identifying causes of said abnormal situations.

37. Apparatus for generating an early warning of an abnormal situation in a process, said process being subject to influence by at least two parameters, said apparatus comprising:
   i. a learning unit for developing a model of said process, said learning unit comprising:
     a. an analysis unit for defining a space representing said process, said space having at least two dimensions, each dimension representing a parameter of said process;
     b. at least one extracting unit for extracting values relating to said parameters; and
     c. a mapping unit for mapping said parameter values onto said space; said analysis unit being further for analyzing said mapping in order to divide said space into regions of high and low probability of occurrence, thereby to form said model;
   ii. an application unit comprising:
     a. at least one parameter measuring unit for measuring at least one parameter to determine at least one parameter value and to form said at least one parameter value into a process vector;
     b. a mapping unit for mapping said process vector onto said model; and
     c. an alert unit for generating a signal when a process vector is mapped onto a region of low probability; and
   iii. a diagnostic unit within said application unit for providing associations between said parameters, said diagnostic unit allowing a user to perform the steps of:
     a. select a mapped parameter;
     b. examine selected ones of associated parameters; and
     c. examine further selected parameters associated with said selected parameters; thereby to identifying causes of abnormal situations in said process.

38. Apparatus for generating an early warning of an abnormal situation in a process, said process being subject to influence by at least two parameters, said apparatus comprising:
   i. a learning unit for developing a model of said process, said learning unit comprising:
     a. an analysis unit for defining a space representing said process, said space having at least two dimensions, each dimension representing a parameter of said process;
     b. at least one extracting unit for extracting values relating to said parameters; and
     c. a mapping unit for mapping said parameter values onto said space; said analysis unit being further for analyzing said mapping in order to divide said space into regions of high and low probability of occurrence, thereby to form said model;
   ii. an application unit comprising:
     a. at least one parameter measuring unit for measuring at least one parameter to determine at least one parameter value and to form said at least one parameter value into a process vector;
     b. a mapping unit for mapping said process vector onto said model; and
     c. an alert unit for generating a signal when a process vector is mapped onto a region of low probability; and
   iii. a process adjustment unit within said application unit for using said regions of high and low probability of occurrence to dictate adjustment of said process via at least one of said parameters, thereby to avoid said abnormal situation.

* * * * *